(12) United States Patent
Weaver et al.

(10) Patent No.: US 11,979,399 B2
(45) Date of Patent: May 7, 2024

(54) ROBUST ENCODING OF MACHINE READABLE INFORMATION IN HOST OBJECTS AND BIOMETRICS, AND ASSOCIATED DECODING AND AUTHENTICATION

(71) Applicant: Digimarc Corporation, Beaverton, OR (US)

(72) Inventors: Matthew M. Weaver, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 228 days.

(21) Appl. No.: 17/408,865

(22) Filed: Aug. 23, 2021

(65) Prior Publication Data
US 2022/0086144 A1    Mar. 17, 2022

Related U.S. Application Data

(63) Continuation of application No. 16/819,612, filed on Mar. 16, 2020, now Pat. No. 11,102,201, which is a
(Continued)

(51) Int. Cl.
*H04L 9/40* (2022.01)
*G10L 19/018* (2013.01)
(Continued)

(52) U.S. Cl.
CPC ........ *H04L 63/0861* (2013.01); *G10L 19/018* (2013.01); *H04L 9/3242* (2013.01); *G06V 40/172* (2022.01); *H04N 19/136* (2014.11)

(58) Field of Classification Search
CPC ......... H04N 2005/91335; H04N 21/84; H04N 2209/608; H04N 1/32144; G06F 21/16
See application file for complete search history.

(56) References Cited

U.S. PATENT DOCUMENTS

| | | | |
|---|---|---|---|
| 4,423,415 | A | 12/1983 | Goldman |
| 5,161,210 | A | 11/1992 | Druyvesteyn |

(Continued)

FOREIGN PATENT DOCUMENTS

| | | |
|---|---|---|
| WO | 2012156774 | 11/2012 |
| WO | 2015100430 | 8/2015 |

OTHER PUBLICATIONS

Bay et al, "SURF: Speeded Up Robust Features," Eur. Conf. on Computer Vision (1), pp. 404-417, 2006.
(Continued)

*Primary Examiner* — Paul E Callahan
(74) *Attorney, Agent, or Firm* — Digimarc Corporation

(57) ABSTRACT

This disclosure details image and audio signal processing methods and associated equipment to robustly encode transaction parameters in rendered displays, printed objects and audio. It also details corresponding decoding methods and equipment to recover these parameters. Further, it details object authentication processing and equipment to validate a transaction for an object, employing a trust network protocol for maintaining a trusted transaction history of the object. Various alternative forms of this technology are described.

11 Claims, 11 Drawing Sheets

Related U.S. Application Data continuation of application No. 15/368,635, filed on Dec. 4, 2016, now Pat. No. 10,594,689.

(60) Provisional application No. 62/263,556, filed on Dec. 4, 2015.

(51) Int. Cl.
*H04L 9/32* (2006.01)
*G06V 40/16* (2022.01)
*H04N 19/136* (2014.01)

(56) References Cited

U.S. PATENT DOCUMENTS

| | | | |
|---|---|---|---|
| 5,673,338 A | 9/1997 | Denenberg | |
| 5,862,260 A | 1/1999 | Rhoads | |
| 6,512,837 B1 | 1/2003 | Ahmed | |
| 6,614,914 B1 | 9/2003 | Rhoads | |
| 6,625,297 B1 | 9/2003 | Bradley | |
| 6,636,615 B1 | 10/2003 | Rhoads | |
| 6,674,876 B1 | 1/2004 | Hannigan | |
| 6,694,041 B1 | 2/2004 | Brunk | |
| 6,711,293 B1 | 3/2004 | Lowe | |
| 6,771,797 B2 | 8/2004 | Ahmed | |
| 6,823,075 B2 | 11/2004 | Perry | |
| 6,978,036 B2 | 12/2005 | Alattar | |
| 6,988,202 B1 | 1/2006 | Rhoads | |
| 6,990,453 B2 | 1/2006 | Wang | |
| 7,020,304 B2 | 3/2006 | Alattar | |
| 7,054,461 B2 | 5/2006 | Zeller | |
| 7,055,034 B1 | 5/2006 | Levy | |
| 7,072,490 B2 | 7/2006 | Stach | |
| 7,076,082 B2 | 7/2006 | Sharma | |
| 7,139,408 B2 | 11/2006 | Rhoads | |
| 7,246,239 B2 | 7/2007 | Rodriguez | |
| 7,330,562 B2 | 2/2008 | Hannigan | |
| 7,352,878 B2 | 4/2008 | Reed | |
| 7,359,889 B2 | 4/2008 | Wang | |
| 7,412,072 B2 | 8/2008 | Sharma | |
| 7,486,827 B2 | 2/2009 | Kim | |
| 7,516,074 B2 | 4/2009 | Bilobrov | |
| 7,519,819 B2 | 4/2009 | Bradley | |
| 7,567,721 B2 | 7/2009 | Alattar | |
| 7,607,016 B2 | 10/2009 | Brunk | |
| 7,721,184 B2 | 5/2010 | Luby | |
| 7,856,116 B2 | 12/2010 | Rodriguez | |
| 7,986,807 B2 | 7/2011 | Stach | |
| 8,094,869 B2 | 1/2012 | Reed | |
| 8,126,203 B2 | 2/2012 | Rhoads | |
| 8,144,368 B2 | 3/2012 | Rodriguez | |
| 8,190,901 B2 | 5/2012 | Barr | |
| 8,989,883 B2 | 3/2015 | Shah | |
| 9,380,186 B2 | 6/2016 | Reed | |
| 9,401,001 B2 | 7/2016 | Reed | |
| 9,449,357 B1 | 9/2016 | Lyons | |
| 9,747,656 B2 | 8/2017 | Stach | |
| 9,891,883 B2 | 2/2018 | Sharma | |
| 9,916,838 B2 | 3/2018 | Grant | |
| 9,928,561 B2 | 3/2018 | Filler | |
| 9,965,628 B2 | 5/2018 | Ford | |
| 10,034,527 B2 | 7/2018 | Korey | |
| 10,043,527 B1 | 8/2018 | Gurijala | |
| 10,147,433 B1 | 12/2018 | Bradley | |
| 10,594,689 B1 | 3/2020 | Weaver | |
| 11,102,201 B2 | 8/2021 | Weaver | |
| 2002/0012445 A1* | 1/2002 | Perry | G06T 1/0071 382/100 |
| 2005/0063562 A1 | 3/2005 | Brunk | |
| 2005/0141707 A1 | 6/2005 | Haitsma | |
| 2005/0259819 A1 | 11/2005 | Oomen | |
| 2006/0075237 A1 | 4/2006 | Seo | |
| 2006/0165311 A1 | 7/2006 | Watson | |
| 2007/0192872 A1 | 8/2007 | Rhoads | |
| 2007/0253594 A1 | 11/2007 | Lu | |
| 2010/0029380 A1* | 2/2010 | Rhoads | A63F 13/45 463/43 |
| 2010/0150434 A1 | 6/2010 | Reed | |
| 2010/0322469 A1 | 12/2010 | Sharma | |
| 2010/0325117 A1 | 12/2010 | Sharma | |
| 2012/0078989 A1 | 3/2012 | Sharma | |
| 2014/0142958 A1 | 5/2014 | Sharma | |
| 2015/0156369 A1 | 6/2015 | Reed | |
| 2015/0187039 A1 | 7/2015 | Reed | |
| 2015/0227922 A1 | 8/2015 | Filler | |
| 2015/0227925 A1 | 8/2015 | Filler | |
| 2015/0379510 A1 | 12/2015 | Smith | |
| 2016/0012421 A1 | 1/2016 | Chitilian | |
| 2016/0098730 A1 | 4/2016 | Feeney | |
| 2016/0164884 A1 | 6/2016 | Sriram | |
| 2016/0217547 A1 | 7/2016 | Stach | |
| 2016/0335628 A1 | 11/2016 | Weigold | |
| 2017/0070778 A1 | 3/2017 | Zerlan | |
| 2017/0076286 A1 | 3/2017 | Castinado | |
| 2018/0096175 A1 | 4/2018 | Schmeling | |

OTHER PUBLICATIONS

Chapters 1-2 of A. Antonopoulos, Mastering Bitcoin Unlocking Digital Cryptocurrencies, 1st Edition, O'Reilly Media, Dec. 2014, 30 pages.

Chapters 4-5 of A. Antonopoulos, Mastering Bitcoin Unlocking Digital Cryptocurrencies, 1st Edition, O'Reilly Media, Dec. 2014.

Chen et al, 'Efficient Extraction of Robust Image Features on Mobile Devices,' Proc. of the 6th IEEE and ACM Int. Symp. on Mixed and Augmented Reality, 2007. (2 pages).

D. Bhowmik and T. Feng, The Multimedia Blockchain: A Distributed and Tamper-Proof Media Transaction Framework, Proc. IEEE Int'l conf. on Digital Signal Processing, 2017, pp. 1-5.

Fujimora et al., Bright: A Fujimora et al., Bright: A Concept fora Decentralized Rights Management System Based on Blockchain, 2015 IEEE 5th International Conference on Consumer Electronics—Berlin (ICCE-Berlin), Sep. 6-9, 2015, pp. 345-346 (Year: 2015).

Mikolajczyk et al, "Performance Evaluation of Local Descriptors," IEEE Trans. Pattern Anal. Mach. Intell., vol. 27, No. 10, pp. 1615-1630, 2005.

Nakamoto, Satoshi, Bitcoin: A Peer-to-Peer Electronic Cash System, 2009, 9 pages.

Rublee, Vincent Rabaud, Kurt Konolige, Gary Bradski "ORB: an efficient alternative to SIFT or SURF", Computer Vision (ICCV), 2011 IEEE International Conference on. IEEE, 2011, 8 pages.

Takacs et al, "Outdoors Augmented Reality on Mobile Phone Using Loxel-Based Visual Feature Organization," ACM Int. Conf. on Multimedia Information Retrieval, Oct. 2008. 8 pages.

U.S. Appl. No. 15/145,784, filed May 3, 2016, 147 pages.

\* cited by examiner

ROBUST ENCODING OF MACHINE READABLE INFORMATION IN HOST OBJECTS AND BIOMETRICS, AND ASSOCIATED DECODING AND AUTHENTICATION

RELATED APPLICATION DATA

This application is a continuation of U.S. patent application Ser. No. 16/819,612, filed Mar. 16, 2020 (now U.S. Pat. No. 11,102,201) which is a continuation of U.S. patent application Ser. No. 15/368,635, filed Dec. 4, 2016 (now U.S. Pat. No. 10,594,689), which claims priority to U.S. Provisional Application No. 62/263,556, filed Dec. 4, 2015. These patents and the provisional application are hereby incorporated by reference in their entirety.

TECHNICAL FIELD

The invention relates to encoding machine readable signals in physical objects and audio-visual signals, and associated decoding.

BACKGROUND AND SUMMARY

Optically readable codes, such as barcodes, provide a versatile means of encoding machine readable information. The codes may be marked on physical objects by various printing or object marking techniques. They may also be displayed on various types of display devices. In either case, the rendered image of the code on an object or display is scanned optically to recover the digital data encoded within the code.

Despite their versatility, conventional barcodes have limitations. One is that a conventional barcode does not easily integrate with other visual information. The code must occupy a distinct spatial area of a rendered image. As such, it detracts from the aesthetic and visual information content of the host image. Further, it is susceptible to copying, manipulation, and swapping.

For some applications, the digital payload of the barcode may be encrypted to restrict access to it. This can mitigate the impact of manipulation of it, yet does not address the inability of the code to integrate with other host signal information, without materially impacting its aesthetic value or altering its perceptual information content. Moreover, conventional barcodes are not applicable to various other forms of host media, most notably audio signals.

The field of steganography pertains to the study of hiding information in host signals, including host imagery or audio signals. Research in this field led to the development of digital watermarks, which convey machine readable, auxiliary data (the "payload") in host images. A form of digital watermark, sometimes referred to as a robust digital watermark, shares some characteristics of barcodes in that it can be applied to objects or displayed and then scanned to recover the payload reliably. It also enables the payload to be woven within other imagery, without detracting from its aesthetic or other visual information content. Further, it has the added versatility of being adaptable to other non-optical signals, including audio signals.

In our prior work, we have detailed methods for robust encoding of auxiliary data in objects and audio. See, e.g., U.S. Pat. No. 6,614,914, US Application Publications 20160217547, and US Publication 20100150434 (with encoding applied to color channels of image content rendered for printing or display); encoding and decoding in video, U.S. Pat. Nos. 7,567,721, 7,139,408, 7,330,562; and with encoding applied in audio channels and associated decoding from ambient audio described in U.S. Pat. No. 7,330,562, US Publication 20140142958 and U.S. application Ser. No. 15/213,335, filed Jul. 18, 2016, entitled HUMAN AUDITORY SYSTEM MODELING WITH MASKING ENERGY ADAPTATION (Now U.S. Pat. No. 10,034,527), Ser. No. 15/145,784, entitled DIGITAL WATERMARK ENCODING AND DECODING WITH LOCALIZATION AND PAYLOAD REPLACEMENT, filed May 3, 2016 (Now U.S. Pat. No. 10,147,433), and U.S. application Ser. No. 15/192,925, filed Jun. 24, 2016, entitled METHODS AND SYSTEM FOR CUE DETECTION FROM AUDIO INPUT, LOW-POWER DATA PROCESSING AND RELATED ARRANGEMENTS (Now U.S. Pat. No. 9,891,883, counterpart international application published as WO2015100430), which are incorporated by reference.

This disclosure details methods and associated equipment to robustly encode transaction parameters in rendered displays, objects and audio. It also details corresponding decoding methods and equipment to recover these parameters. Further, it details authentication processing and equipment to validate a transaction, employing a trust network protocol for maintaining a trusted transaction history. Various alternative forms of this technology are described.

One technical feature of this disclosure is a device comprising a memory configured to store an image signal and transaction parameters. The transaction parameters comprise a key and an address of a transaction in a trust network. The device comprises a processor, in communication with the memory. The processor is configured with instructions to extract features from the image signal and form a digital payload comprising the features, the key and the address. These image features bind the digital payload to the image signal in which it is embedded. To embed the payload, the processor is configured with instructions to modulate a carrier signal with the digital payload to produce a modulated carrier signal, map elements of the modulated carrier signal to locations within the image signal, and modify the image signal at the locations according to corresponding elements of the modulated carrier signal to form an encoded image signal in which the features, key and address are encoded.

Another technical feature of this disclosure is a device comprising an image sensor, a memory configured to store an image captured from the image sensor, and a processor, in communication with the memory. This device is a compatible decoder for the above-summarized digital payload embedded in a content object. The processor is configured with instructions to determine a geometric transformation of the image, extract features from the image using the geometric transformation to locate the features, and decode an auxiliary data signal encoded within the image using the geometric transformation to locate bit cells in which elements of the auxiliary data signal are encoded. The auxiliary data signal comprises transaction parameters and an encoded hash of the features. The transaction parameters comprise a transaction key and address associated with a user. The processor is further configured with instructions to compute a first hash of the features, compare the first hash of the features with the encoded hash, form a transaction with the transaction key and address, and submit the transaction to a distributed trust network to complete the transaction.

One aspect of the invention is a system comprising a plurality of computing nodes. These computer nodes are in communication via a network via a network communication protocol, such as TCP. A first computing node comprises memory and a processor, the processor configured with instructions to:

obtain a request of a first party to process a transaction of a first content item, the first content item comprising a content signal stored in the memory, the transaction comprising distribution of the first content item;

obtain a transaction parameter for the transaction and record the transaction parameter in a distributed blockchain registry, the transaction parameter comprising an address of the transaction;

extract features from the content signal in the first content item;

form a digital payload comprising the address;

modulate a carrier signal with the digital payload to produce a modulated carrier signal;

map elements of the modulated carrier signal to locations within the content signal; and modify the content signal according to the features and corresponding elements of the modulated carrier signal to form an encoded content signal in which the address is encoded; and digitally sign the transaction into a signed message and provide the signed message and address for the transaction to a distributed blockchain registry in the plurality of computing nodes to register the transaction for the first content item in the blockchain registry.

These are but a few of the novel technology configurations described in this document. Several alternative embodiments and variants that apply to different types of objects and network transactions are described below.

DETAILED DESCRIPTION

Figure 1:
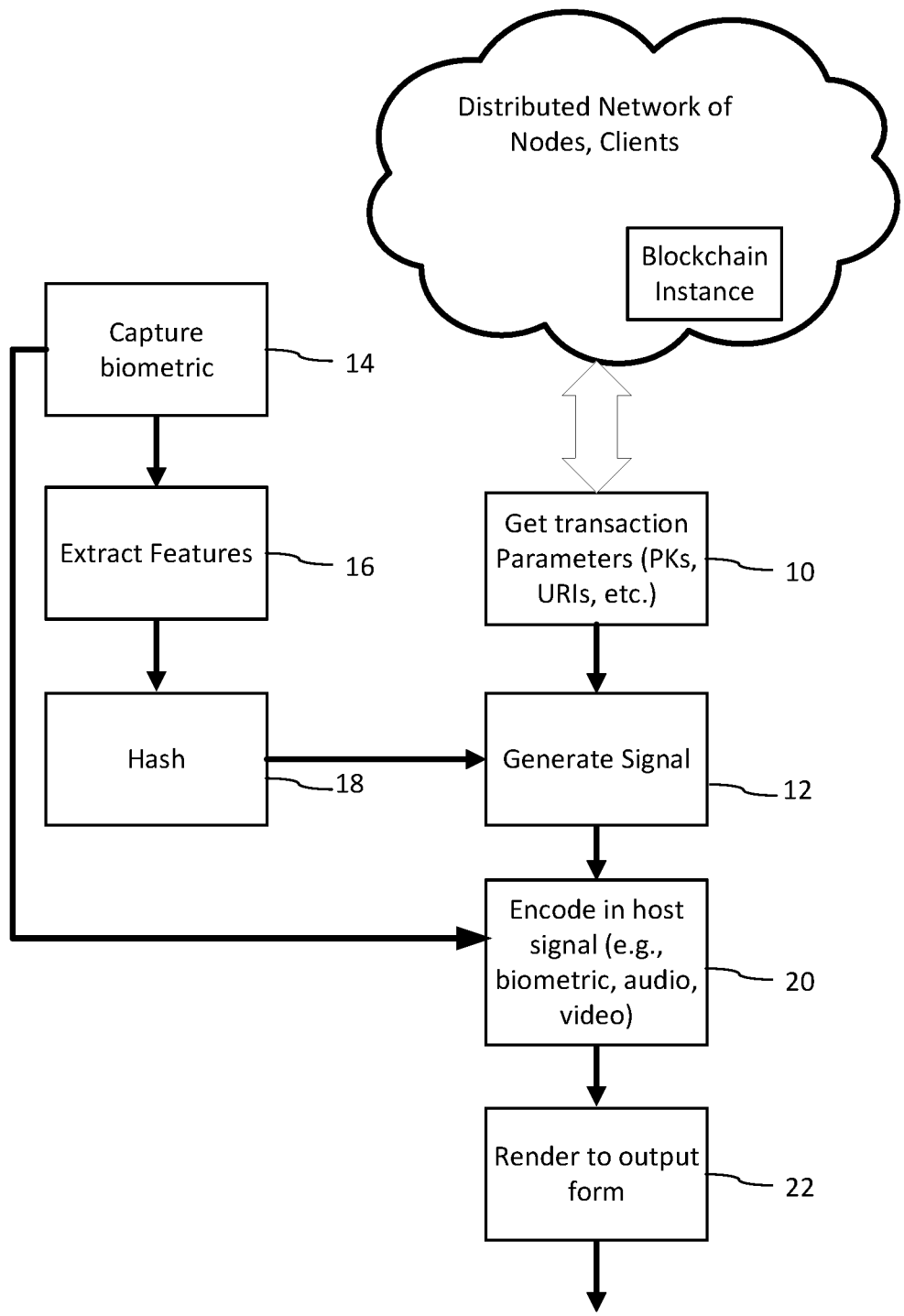
FIG. 1 is a flow diagram illustrating a method of incorporating a payload (e.g., transaction parameters) into biometric, rendered to physical output.

FIG. 1 is a flow diagram illustrating a method of incorporating a payload (e.g., transaction parameters) into a biometric, which is rendered to physical output. The payload is used to convey transaction parameters in machine readable form within the rendered biometric. This method weaves the transaction parameters into the biometric, persistently linking them together. This persistent linking provides an additional factor of authentication for the transaction by linking the biometric of a party to the transaction with the transaction parameters. It also provides a convenient means to persistently store the transaction parameters for later use, as it encodes the payload in a rendered output form that may be physically stored in variety of convenient forms. These storage forms include both persistent data storage medium, such as an electronic, magnetic or optical medium, as well as marking on a physical object, by printing, engraving, etching, etc. the encoded biometric image on that object. This linkage of payload and object is persistent as it survives the physical transformation from digital to physical form, as well as the digitization of the physical form, when it is sensed by an image sensor.

The rendered form also provides a convenient and trusted vehicle to automate a transaction. To execute the transaction, an image capture program within a mobile application program (or other client) is used to capture an image of the display or printed object. The client then decodes the payload from the image, which includes the transaction parameters, and executes the transaction.

These transaction parameters are used in connection with a trust network to complete a transaction. The trust network is comprised of a public ledger and a number of participating computer nodes, in a distributed network, that validate a transaction, through its transaction parameters and the public ledger.

In one application, the transaction is a transfer of monetary value, in a crypto-currency. This application the trust network establishes that the one purported to hold the monetary value (tied to that entity's private-public encryption key pair) is the valid holder of that monetary value by virtue of an output of one or more prior transactions according to the public ledger of the trust network. The public ledger is recorded in a blockchain. To implement the blockchain, one may construct a blockchain and associated protocol, based on the blockchain of the bitcoin protocol. For background, please see Bitcoin: A Peer-to-Peer Electronic Cash System, by Satoshi Nakamoto, the originator of Bitcoin. This protocol is further explained in A. Antonopoulos, Mastering Bitcoin Unlocking Digital Cryptocurrencies, $1^{st}$ Edition, O'Reilly Media, December, 2014, which is hereby incorporated by reference, and is also available on Github, in a repository that contains the text, images and software code within the book. Bitcoin source code is also available on Github at https://github.com/bitcoin/bitcoin.

Returning to FIG. 1, the method begins by getting the transaction parameters (10). In the case of our crypto-currency application, the parameters are the user's private key and associated address (URI) in the bitcoin network. Other parameters include a monetary amount to be transacted. This amount in units of crypto-currency corresponds to a bitcoin transaction output encumbered against the bitcoin address of the user. The user's private key is used in a signing process to provide a signature that unlocks that output.

In other applications, the parameters are similar (e.g., private key, and address into the trust network), yet are applied to different types of transactions. One example is a transaction to validate ownership of or usage rights in a serialized object or item of digital content (such as a song, TV program, movie, or other audio or visual creative work). In this type of application, the transaction parameter includes a serialized ID assigned to, and preferably encoded in the serialized object and encoded in the transaction history record within the blockchain, applying the encoding methodologies described in this document.

Next, as reflected in block 12, the method generates an auxiliary data signal from the transaction parameters and a biometric of the user. More detail on generating the auxiliary signal is provided below. The process includes calculating check bits (e.g., Cyclic Redundancy Check (CRC), checksum, or like function) from a payload comprised of a digital data sequence (e.g., coded in binary symbols) of the transaction parameters. The payload may also include a hash of the biometric of the user. Alternatively, the hash of the biometric may form a separate payload, where both payloads are converted to auxiliary data signals for encoding in the biometric image.

Blocks 14-18 correspond to the process of capturing the biometric from a user and transforming it into a digital signal that forms part of the payload. The biometric is captured in an image form (14). For the crypto-currency application, the biometric is a color facial image of the user, captured with a conventional digital image sensor (e.g., a digital camera in a smartphone). A feature extraction program (16) is executed to extract features from the image. One approach is to segment a luminance conversion of the color image into blocks, and convert each of the blocks into coefficients in a frequency domain (e.g., DCT domain). A robust hash routine (18) then converts the coefficients (e.g., a low frequency subset, except DC) into a hash value. One approach is to quantize the coefficients by comparing each with a block threshold (e.g., median value of the selected coefficient values of the block) and construct a string of binary values (0, 1) or (−1, 1) based on whether a coefficient is below or above the threshold. For additional teaching on methods to generate this type of signature from a facial image and embed it in the facial image, please see U.S. Pat. Nos. 8,190,901, 7,519,819, which are hereby incorporated by reference. Another approach is to extract corner features as in SIFT or SURF from each block and construct a hash of corner feature locations registered per block. For example, in one embodiment, the hash is formed of corner locations per block by generating as the hash the coordinates of the strongest 2-3 SIFT features per image block (e.g., 128 by 128 or 256 by 256 pixels per 100 DPI block), relative to a block corner or center. Please see US Application Publication 20100322469, which is hereby incorporated by reference, for more information on extracting and evaluating strongest features within an image.

Returning to block 12 of FIG. 1, this hash sequence is used to form an auxiliary data signal. As noted, this hash sequence may be appended to the transaction parameters to form one payload, or may form a separate payload, from which a separate auxiliary data signal is generated, relative to the data signal formed from the payload of the transaction parameters. The resulting digital sequence is error correction coded in preparation for encoding in a block of the biometric image.

In block 20, the auxiliary data signal(s) are encoded in blocks of the biometric image. The result is an encoded biometric image that appears like the original, yet has the payload(s) embedded within it.

As shown in block 22, this encoded biometric image may now be rendered into a display or marked on an object (e.g., printed, engraved, or etched on a substrate). This encoded biometric is a digital image, which may also be stored as described above, for later retrieval and rendering onto a physical object or into a display.

For more on applications of display to camera transfer of the encoded image, please see our US Patent Application Publications US 20150227922 and US 20150227925, which are hereby incorporated by reference. These documents detail embodiments in which the displayed images on a mobile device convey the images to another device via its camera. These approaches provide additional payload capacity, which is useful for encoding transaction parameters, including 256 bit keys from public/private key pairs, addresses, and other parameters typical in a bitcoin transaction.

Figure 2:
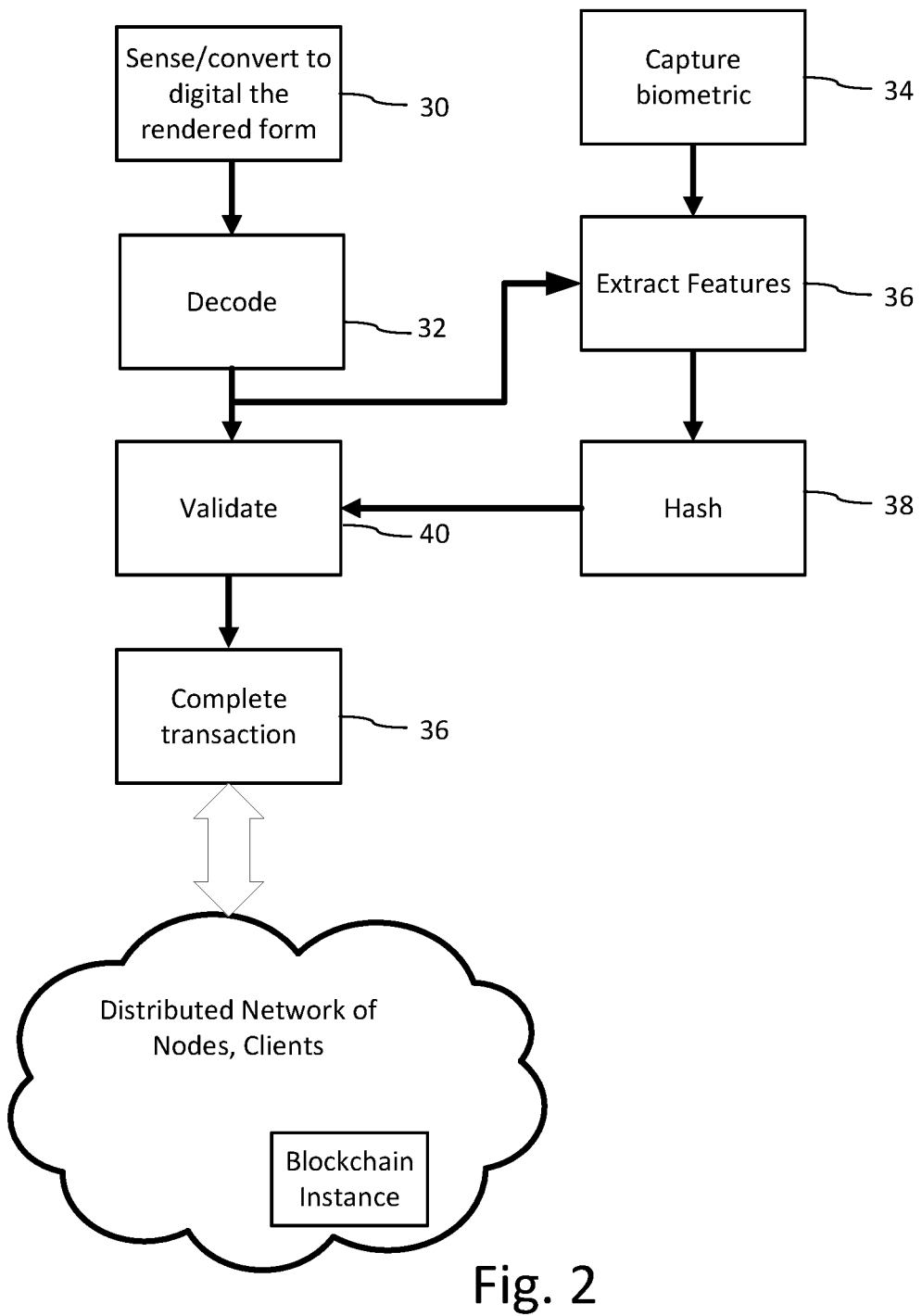
FIG. 2 is a flow diagram illustrating a method of decoding and applying the payload.

FIG. 2 is a flow diagram illustrating a corresponding method of decoding and applying the payload. This method may be executed in a mobile application executing on a smartphone or other portable device, or other client executing on other types of computers. With such application program, a user presents the encoded biometric to complete a transaction. The method is executed in any circumstances where the user wants to complete a transaction based on the transaction parameters.

As a first factor of authentication, the biometric enables a human representative of a party to the transaction to cross check the user manually against the object or display. The representative simply visually compares the facial image printed or displayed with the face of the user. Other factors of authentication may also be included in the transaction process. For example, the user may be required to supply a secret personal identification number (PIN), which is required to unlock the transaction parameters from the encoded image. The unlocking process may entail decoding the payload with a private watermark decoding key and/or decrypt an encrypted payload encoded in the image, with a decryption key, both accessed via the PIN.

FIG. 2 also depicts an option where a biometric supplied by the user is machine validated against the biometric encoded in the printed object or displayed item being presented by the user. This option may be used as an additional check of the facial image. Another biometric may also be used in this process, such as a fingerprint from the user's hand, a retinal or iris scan of the user's eye, or other biometric.

In the case where the encoded biometric image is rendered to a display or physical object, the process begins by capturing a digital image(s) of that image (30). Next, the image is processed to decode the embedded auxiliary signals (32), and in particular to extract the payload(s).

In the case of an automated biometric check, the method captures a biometric of the user (34), extracts the features (36) and converts the extracted features into a hash. For the case where the same biometric is used as the one encoded with transaction parameters, this process is similar to the one described for the encoding process of FIGS. 1 (14, 16, and 18). However, prior to feature extraction, the newly captured image is geometrically registered against the scanned image used in the decoding process (32). The decoding process (32), as a preliminary step, geometrically registers the scanned image by determining the affine transformation of that image relative to the original image at the time of encoding the payload(s), using a synchronization process. This synchronization process enables the decoder to accurately sample bit cells within each block of the encoded auxiliary signal to extract the payload. This process compensates for geometric distortion incurred in the rendering/scanning processes. It also enables the feature extraction process (36) to register the newly captured biometric image to the same geometric registration as the original image at the time of encoding.

As an alternative, a different biometric may be used to validate the user presenting the encoded image. For example, whereas a facial image is used as a first biometric encoded with the transaction information, a different biometric, such as the user's hand fingerprint, may be used as a second biometric for authenticating the user. This second biometric may be encoded within the first biometric and validated automatically according to the methodology described in US Patent Application publication 20050063562, which is hereby incorporated by reference.

This option provides an additional variant where, instead of encoding transaction information in a biometric image, the transaction information may be encoded in a different host image or even a host audio signal, along with a hash of a biometric. The different host image or audio can be an arbitrary image or audio file selected by the user, or some other image or audio selected by a counterparty to the transaction. For example, the host image or audio may be selected uniquely for conveying transaction parameters, which remain valid only for a particular place or time, or for redemption through a particular counterparty. In this case, the hash of the biometric of the user's facial image, and/or fingerprint image or other biometric, may be encoded within the host image or audio signal, along with the transaction parameters, as described above (and detailed further below).

This encoded host image or audio is then presented by the user to another party to complete the transaction. In the case of audio, the user's smartphone application, or other wallet application includes a routine to play the audio to process the transaction. The audio is captured and digitized, and decoding of its payload(s) continues from that point.

Returning to FIG. 2, a process (40) in the application compares the hash of the newly capture biometric with the one decoded from the scanned version of the encoded image (or audio). This process of comparing is implemented as a correlation operation between the two hashes to produce a correlation value. The correlation value, or normalized correlation, is then compared with a threshold to determine whether it surpasses the threshold. If so, the biometric check has succeeded.

If that biometric check succeeds, the application proceeds to complete the transaction. The specifics of the transaction processing vary with the application. For the crypto-currency application for example, the transaction parameters are decrypted, formulated into a bitcoin transaction, and submitted to the bitcoin network for processing. The party receiving the bitcoin may then conduct a subsequent transaction to convert the bitcoin it has just received into cash in another currency, e.g., a paper currency where the user is currently located, and provide that cash to the user.

For applications designed to validate or manage serialized objects or audio visual program content, the transaction parameters are issued to a process for vetting the transaction history of the serialized object against a ledger, which is also implemented as a blockchain similar to the bitcoin protocol, but with the objective of checking ownership or control history of the object. This check can be used to determine whether an entity is an authorized holder of the object or content. Further, it may also then determine whether that holder is entitled to create derivatives of the object or content. In particular, a party may seek to record its rights in an object or piece of content, which entitles it to create a derivative work. That holder may then be authorized to encode a new layer of transaction parameters into the derivative work. This provides a scheme for managing layered watermark encoding schemes for objects or content that is re-purposed and licensed for different uses.

We now turn to additional description of encoding and decoding technologies.

Signal Encoder and Decoder

Figure 3:
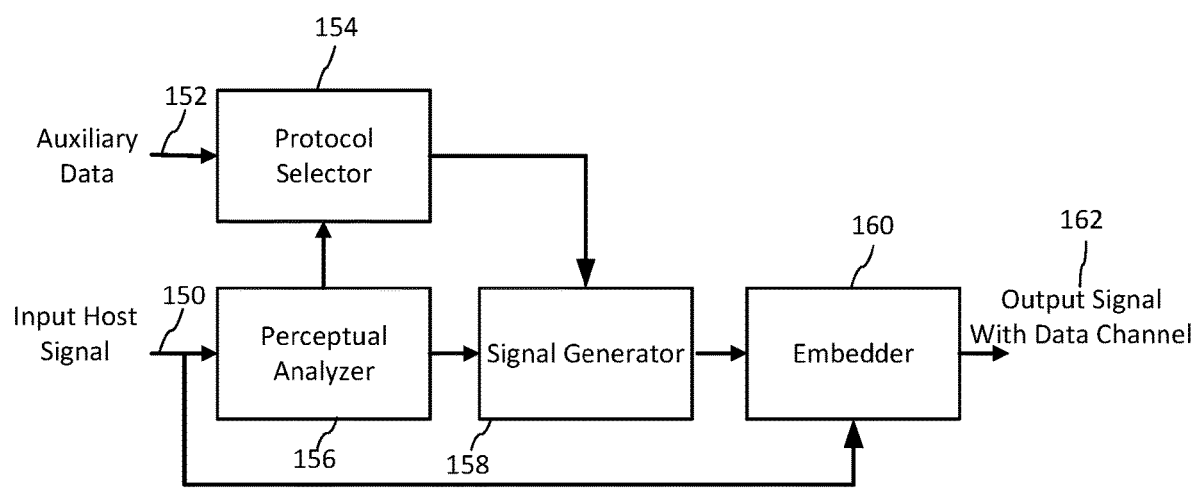
FIG. 3 is a block diagram of a signal encoder for encoding a data signal into a host signal.
Figure 4:
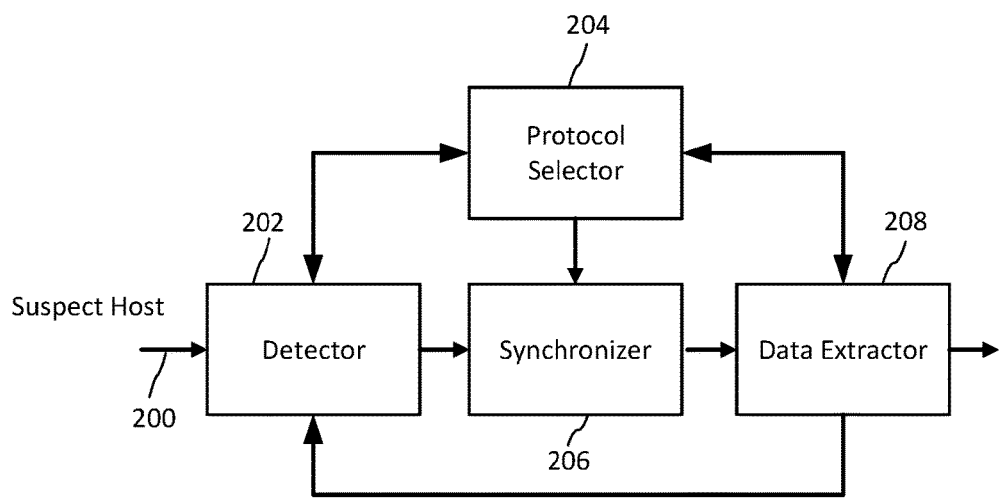
FIG. 4 is a block diagram of a signal decoder for extracting a data signal from a host signal.

FIG. 3 is a block diagram of a signal encoder for encoding a digital payload signal into a host signal. FIG. 4 is a block diagram of a compatible signal decoder for extracting the digital payload signal from a host signal.

While the signal encoder and decoder may be used for communicating a data channel for many applications, our particular focus has been robust signal communication in host image or audio type signals. Encoding and decoding is typically applied digitally, yet the signal survives digital to analog transformation and analog to digital transformation. For example, the encoder generates a modulated image or audio signal that is converted to a rendered form, such as a printed image, displayed image or video, or output of an audio transducer or speaker. Prior to decoding, a receiving device has a sensor such as a camera or microphone to capture the modulated signal, convert it to an electric signal, which is digitized and then processed by the decoder.

Inputs to the signal encoder include a host signal 150 and auxiliary data 152. The objectives of the encoder include encoding a robust signal with desired payload capacity per unit of host signal, while maintaining perceptual quality. In some cases, there may be very little variability or presence of a host signal, in which case, there is little host interference on the one hand, yet little host content in which to mask the presence of the data channel. Some examples include a package design that is devoid of much image variability (e.g., a single, uniform color). For color facial images, there is more host image variability for masking.

The auxiliary data 152 includes the variable data information to be conveyed in the data channel, possibly along with other protocol data used to facilitate the communication.

The protocol defines the manner in which the signal is structured and encoded for robustness, perceptual quality or data capacity. For any given application, there may be a single protocol, or more than one protocol. Examples of multiple protocols include cases where there are different versions of the channel, different channel types (e.g., several digital watermark layers within a host). Different versions may employ different robustness encoding techniques or different data capacity. Protocol selector module 154 determines the protocol to be used by the encoder for generating a data signal. It may be programmed to employ a particular protocol depending on the input variables, such as user control, application specific parameters, or derivation based on analysis of the host signal.

Perceptual analyzer module 156 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (now issued as U.S. Pat. No. 9,380,186), Ser. No. 14/588,636 (now issued as U.S. Pat. No. 9,401,001) and Ser. No. 13/975,919 (now issued as U.S. Pat. No. 9,449,357), Patent Application Publication 20100150434, and U.S. Pat. No. 7,352,878, which are hereby incorporated by reference.

When the host signal is sound (either a host digital audio signal and/or transmitting the encoded data within an ambient sound environment), the perceptual analyzer may be used to analyze the host sound and then select a protocol and perform perceptual masking depending on the host sound. For more information on such perceptual analysis for audio, please see our US Patent Application Publication 20140142958, incorporated above, and U.S. Provisional Application, 62/194,185, entitled HUMAN AUDITORY SYSTEM MODELING WITH MASKING ENERGY ADAPTATION and its non-provisional counterpart U.S. application Ser. No. 15/213,335, filed Jul. 18, 2016 (now issued as U.S. Pat. No. 10,043,527), which are hereby incorporated by reference.

The perceptual analyzer module 156 also computes a perceptual model, as appropriate, to be used in controlling the modulation of a data signal onto a host channel as described below.

The signal generator module 158 operates on the auxiliary data and generates a data signal according to the protocol. It may also employ information derived from the host signal, such as that provided by perceptual analyzer module 156, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 160 takes the data signal and modulates it onto a channel by combining it with the host signal. The operation of combining may be an entirely digital signal processing operation, such as where the data signal modulates the host signal digitally, may be a mixed digital and analog process or may be purely an analog process (e.g., where rendered output images or audio are combined, with some signals being modulated data and others being host content).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host channel by adding a scaled data signal or multiplying by a scale factor dictated by the data signal value corresponding to the embedding location, with weights or thresholds set on the amount of the adjustment according to the perceptual model, robustness model, and available dynamic range. The adjustment may also be altering by setting the modulated host signal to a particular level (e.g., quantization level) or moving it within a range or bin of allowable values that satisfy a perceptual quality or robustness constraint.

As detailed further below, the signal generator produces a data signal with data elements that are mapped to embedding locations in the data channel. These data elements are modulated onto the channel at the embedding locations. The embedding locations are typically arranged in a pattern of embedding locations that form a tile. The tile derives its name from the way in which it is repeated in contiguous blocks of a host signal, but it need not be arranged this way. In images, we use tiles in the form of a two dimensional array (e.g., 128 by 128, 256 by 256, 512 by 512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., a bit) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host so that it satisfies a perceptual quality metric as determined by perceptual model (e.g., visibility or audibility model) for embedding locations across the signal. Another approach is to modulate the host so that it satisfies a robustness metric across the signal. Yet another is to modulate the host according to both the robustness metric and perceptual quality metric derived for each embedding location. The incorporated documents provide examples of these techniques. Below, we highlight a few examples.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. application Ser. No. 14/616,686 (U.S. Pat. No. 9,380,186), Ser. No. 14/588,636 (U.S. Pat. No. 9,401,001) and Ser. No. 13/975,919 (U.S. Pat. No. 9,449,357), Patent Application Publication 20100150434, and U.S. Pat. No. 7,352,878, already incorporated herein.

For audio signals, approaches for perceptual models for encoding auxiliary signals in audio are described in 20140142958.

The embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. Nos. 14/616,686, 14/588,636 and 13/975,919 for image related processing and 20140142958 for audio related processing.

This modulated host is then output as an output signal 162, with an embedded data channel. The operation of combining also may occur in the analog realm where the data signal is transformed to a rendered form, such as a layer of ink, graphic overlay or audio signal, and then combined with a similar host signal form, including the ambient signal environment, with which it is mixed. One example is a data signal that is combined as a graphic overlay to other video content on a video display by a display driver. Another example is a data signal that is overprinted as a layer of material, engraved in, or etched onto a substrate, where it may be mixed with other signals applied to the substrate by similar or other marking methods. Yet another example is the output of a data signal as an audio signal (e.g., at the boundaries of the human auditory range, 20 Hz at the low end or 20 kHz at the high end), which is mixed with other audio either electronically in a sound card, or in the ambient environment when played and mixed with other sounds. In these cases, the embedder employs a predictive model of distortion and host signal interference, and adjusts the data signal strength so that it will be recovered more reliably. The predictive modeling can be executed by a classifier that classifies types of noise sources or classes of host signals and adapts signal strength and configuration of the data pattern to be more reliable to the classes of noise sources and host signals that the encoded data signal is likely to encounter.

The output 162 from the embedder signal typically incurs various forms of distortion through its distribution or use. For printed objects, this distortion occurs through rendering an image with the encoded signal in the printing process, and subsequent scanning back to a digital image via a camera or like images sensor. For displayed images, this distortion occurs in the rendering of the image to the display and subsequent capture via a camera or like image sensor. For ambient audio channels, this distortion occurs through analog conversion and output on a speaker and subsequent recapture via a microphone. This distortion is what necessitates robust encoding and complementary decoding operations to recover the data reliably.

Turning to FIG. 4, the signal decoder receives an encoded host signal 200 and operates on it with one or more processing stages to detect a data signal, synchronize it, and extract data. The detector is paired with an input device in which a sensor or other form of signal receiver captures an analog form of the signal and an analog to digital converter converts it to a digital form for digital signal processing. Though aspects of the detector may be implemented as analog components, e.g., such as preprocessing filters that seek to isolate or amplify the data channel relative to noise, much of the signal decoder is implemented as digital signal processing modules that implement the signal processing operations describe herein.

The detector 202 is a signal processing module that detects presence of the data channel. The incoming signal is referred to as a suspect host because it may not have a data channel or may be so distorted as to render the data channel undetectable. The detector is in communication with a protocol selector 204 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 204.

The synchronizer module 206 synchronizes the incoming signal to enable data extraction. Synchronizing includes, for example, determining the distortion to the host signal and compensating for it. This process provides the location and arrangement of encoded data elements within the host signal.

The data extractor module 208 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory, such as a RAM memory.

Signal Generator

Figure 5:
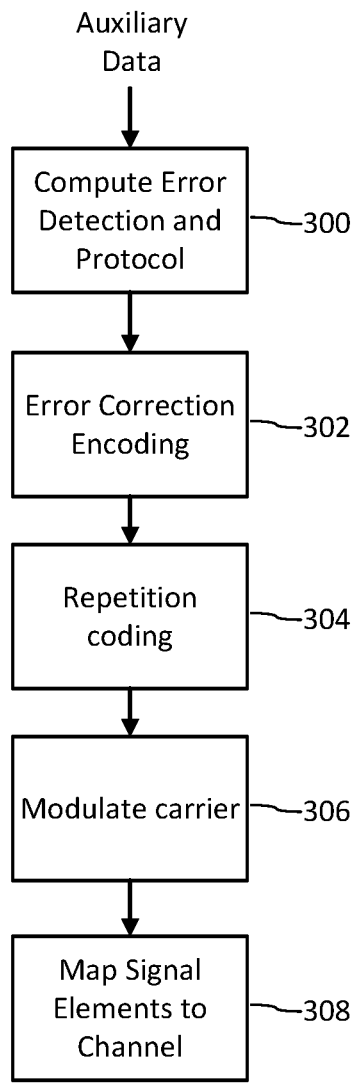
FIG. 5 is a flow diagram illustrating operations of a signal generator.

FIG. 5 is a flow diagram illustrating operations of a signal generator. Each of the blocks in the diagram depict processing modules that transform the input auxiliary data into a data signal structure. For a given protocol, each block provides one or more processing stage options selected according to the protocol. In processing module 300, the auxiliary data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

The transaction parameters included in the payload are encoded in a binary format. That format may adhere to encoding formats typically used for private and public keys and associated bitcoin addresses, such as Base58 and Base58Check payload encoding formats from Wallet Import Format (WIF), WIF compressed and like formats.

Error correction encoding module 302 transforms the message symbols into an array of encoded message elements (e.g., binary or M-ary elements) using an error correction method. Examples include block codes, BCH, Reed Solomon, convolutional codes, turbo codes, etc.

Repetition encoding module 304 repeats the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder must be able to extract estimates of the coded bits at the embedding locations. This requires the decoder to synchronize the image or audio signal under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication 20120078989, which is hereby incorporated by reference, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. application Ser. No. 14/724,729 (Now U.S. Pat. No. 9,747, 656), which are hereby incorporated by reference.

Signal Embedding in Host

Figure 6:
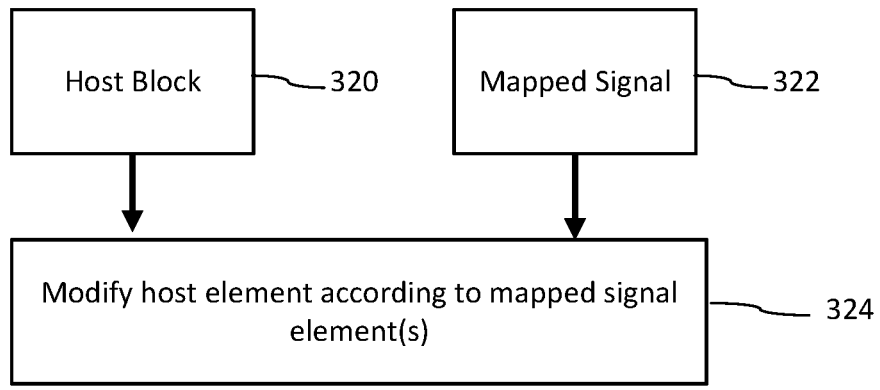
FIG. 6 is a diagram illustrating embedding of an auxiliary signal into host signal.

FIG. 6 is a diagram illustrating embedding of an auxiliary signal into host signal. As shown, the inputs are a host signal block (e.g., blocks of the biometric host image) (320) and an encoded auxiliary signal (322), which is to be inserted into the signal block. The encoded auxiliary signal may include an explicit synchronization component, or the encoded payload may be formulated to provide an implicit synchronization signal. Processing block 424 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment. In implementations with an explicit synchronization signal, the encoded payload and synchronization signals may be combined and then added, or added separately with separate mask coefficients to control the signal amplitude independently.

For audio, the host signal blocks correspond to time segments of an audio signal (or frequency domain transform thereof). To expand payload capacity, the payload is varied over time, so that components of the payload are transmitted in series or time interleaved fashion. Each payload component is encoded over a time segment, with redundancy within the segment as required to achieve desired robustness to survive ambient transmission and capture by microphone. In the decoder, payload components decoded from different time segments are aggregated (appended, concatenated, or the like) to reconstruct the complete payload (e.g., 1000 bits and up).

For displays, the mapped signal may be varied over time to convey a changing payload within a host image block. In particular, please see, e.g., US Patent Application Publications US 20150227922 and US 20150227925, which describe how to encode a digital payload in a screen display, and corresponding decoding of the digital payload from digital video captured of the screen display. US 20150227922 and US 20150227925 describe embodiments in which erasure codes are used to encode the digital payload over a series of displayed video frames, which are updated with different payload component at a frame rate, e.g., 30 frames per second. An embodiment of this the payload encoding uses erasure codes, as described in U.S. Pat. No. 7,721,184, which is hereby incorporated by reference. A similar strategy may be employed for time segments of audio, in which payload components are encoded in time chunks of audio. For example, each audio chunk in a series conveys 1 of 10 different payload components, and then the series repeats.

In one approach, the display screen depicts a host image that appears static, yet has a payload that is changing within it. This approach may be used to simulate a physical object like a banknote or payment card on the display screen, e.g., with or without a biometric image, such as the user's facial image, included in the host image.

In another approach, the display screen depicts a host video of a motion sequence, such as a short video clip. Whether or not the host is varying, the payload components may be varied over time to increase payload capacity, yet allow robust delivery to another device. The receiving device captures a video stream of the screen, decodes the payload components from several frames, and reconstructs the payload from the payload components.

For the sake of illustrating embedding in in a biometric, we describe embedding of the generated auxiliary signal into a host image, and in particular, a facial image of person to be authenticated. The mapping module maps coded message elements, and for explicit synchronization protocols, the synchronization signal, to embedding locations within host image blocks. The inputs to the embedding process are host image blocks (320) and mapped signal(s), including coded payload and synchronization signals. The host image is sub-divided into blocks, and the mapped signals are assigned for insertion into embedding locations of these blocks.

The size of host image blocks and tile of embedding locations within these blocks are designed to have sufficient carrying capacity for desired robustness and image quality.

For encoding of transaction parameters, an encoding protocol is designed to have sufficient payload capacity to store the transaction parameters within an image, and also facilitate robust decoding from scanned images. For crypto-currency applications, the public/private keys, addresses, and hashes tend to have length of 256 bits as they employ encryption standards with 256 bit keys. Bitcoin, for example, uses elliptic curve cryptography defined in a standard called secp256k1, established by the National Institute of Standards and Technology (NIST), and a cryptographic one-way hash function, SHA-256. It is possible to design a system with shorter keys, but that depends on desired security of the underlying crypto-currency or trust network system. Thus, to accommodate carrying of key, address, monetary amount, and other pertinent transaction parameters, along with CRC, we design the payload to carry at least a thousand bits (e.g., 1024), along with extensibility to protocol variants for carrying more data. This payload is formed from the transaction parameters, protocol identifiers (to specify payload size and format), and CRC or like checksum bits.

Applying the method of FIG. 5, the transaction parameters are formatted into a binary sequence, which is encoded and mapped to the embedding locations of a tile. For illustration, we describe an implementation of a 256 by 256 tile of embedding locations, where the embedding locations correspond to spatial domain embedding locations within an image. In particular, the spatial locations correspond to pixel samples at a configurable spatial resolution, such as 100 or 300 DPI. In this example, we will explain the case where the spatial resolution of the embedded signal is 300 DPI, for an embodiment where the resulting digitally watermarked facial image is printed on a paper substrate. The payload is repeated in contiguous 256 by 256 tiles of embedding locations. With these embedding parameters, an instance of the payload is encoded in each tile, occupying a block of host image of about 1.28 by 1.28 inches. These parameters are selected to provide a printed version of the facial image on paper, along with other graphic elements as desired that is a convenient form factor and size for storage and carrying within a physical wallet. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as elaborated upon below.

In one implementation for crypto-currency, the binary sequence of the payload includes a private key, bitcoin address, monetary amount. Additional protocol bits are added to communicate the payload version. From the resulting binary bit sequence, a CRC is computed. The size of the CRC can be adapted based on desired payload capacity. In the case of a 1024 bit payload, the remaining capacity not occupied by the 256 bit key, address and other fields may be used to carry a CRC, or like checksum.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

There are several alternatives for mapping functions to map the encoded payload to embedding locations. In one, these elements have a pseudorandom mapping to the embedding locations. In another, they are mapped to bit cell patterns of differentially encoded bit cells as described in Ser. No. 14/724,729, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publications 20140142958 and 20100150434, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 5. These bits are modulated onto a pseudo-random carrier to produce watermark signal elements (block 306 of FIG. 5), which in turn, are assigned to the pseudorandom embedding locations within the sub-blocks (block 308 of FIG. 5). An embedder module modulates this signal onto a host signal by increasing or decreasing host signal values at these locations for each error correction coded bit according to the values of the corresponding elements of the modulated carrier signal for that bit.

Generating and Permuting Robust Image Hashes

Figure 7:
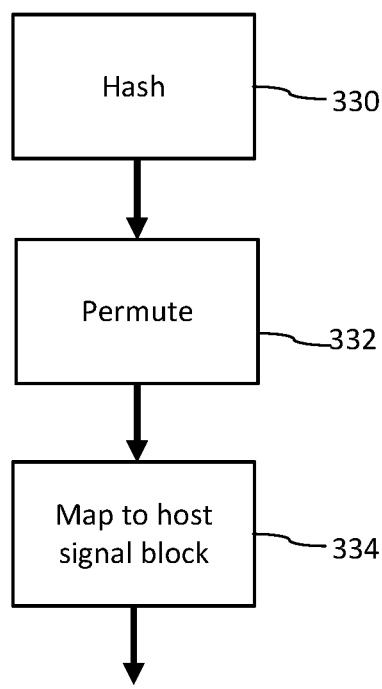
FIG. 7 is a flow diagram illustrating a method of preparing an image hash for encoding into a host signal.

FIG. 7 is a flow diagram illustrating a method of preparing an image hash for encoding into a host signal. As described above, there are alternative configurations in which an image hash is encoded as an auxiliary signal component in the host signal. In one configuration, the encoding of the image hash provides a method of locking the host image signal to auxiliary information encoded within it. In another configuration, it provides a method for embedding a user's biometric in the host image signal.

Examples of the image hash include a subset of quantized frequency coefficients of an image block, fingerprint minutiae (20050063562), or robust image descriptors, e.g., SIFT, SURF, ORB features, including robust image descriptors based on corner features.

As a preliminary step, the image from which the hash is derived may be subdivided into blocks so that the method is applied to each of the blocks. In the configuration where the image being hashed is also the host image, these image blocks may be the same image blocks into which the encoded payload of transaction parameters is encoded.

Next, a hash is computed for the block (330). The hash method is dependent on the type of image hash. U.S. Pat. No. 8,190,901 describes a method for quantizing frequency coefficients of an image block, namely DCT coefficients. US Publication 20050063562 describes a method of creating a hash from fingerprint minutiae, namely a minutiae map of a human fingerprint. Corner features and like robust image descriptors are derived using a feature extraction method like SIFT, SURF, ORB, or others in the literature referenced below.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

While SIFT is a well-known technique for generating robust local descriptors, there are others. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the 6.sup.th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

ORB refers to Oriented Fast and Rotated BRIEF, a fast local robust feature detector. For information about it, please see, Ethan Rublee, Vincent Rabaud, Kurt Konolige, Gary Bradski "ORB: an efficient alternative to SIFT or SURF", Computer Vision (ICCV), 2011 IEEE International Conference on. IEEE, 2011.

Returning to FIG. 7, the robust hash is permuted to form an auxiliary signal for encoding in the host signal block (332). In one embodiment, the robust hash comprises locations of extracted features, such as minutiae, corners, or the like. These feature locations are mapped to corresponding locations within a Fourier domain of the host image block. The (X, Y) locations of the features in a spatial domain block are used to index corresponding Fourier domain coordinates of the image block. The resulting signal is similar to the above-reference explicit synchronization signal, in that it is comprised of peaks or impulses at these Fourier domain coordinates, and each feature is assigned pseudorandom phase. Next, the resulting signal is transformed by inverse FFT to the spatial domain, and scrambled by permuting the spatial domain signal with a pseudorandom key.

In another embodiment, the robust hash is formed into a binary sequence, and permuted by multiplying by or XOR-ing with a pseudorandom key. An example of the binary sequence is the signal formed by quantizing a selected subset of frequency coefficients.

In both cases, the resulting scrambled signal is mapped to embedding locations within a host signal block (334). It is then inserted into the host image block at these embedding locations using a similar method as described above for the encoded payload and explicit synchronization components.

Figure 8:
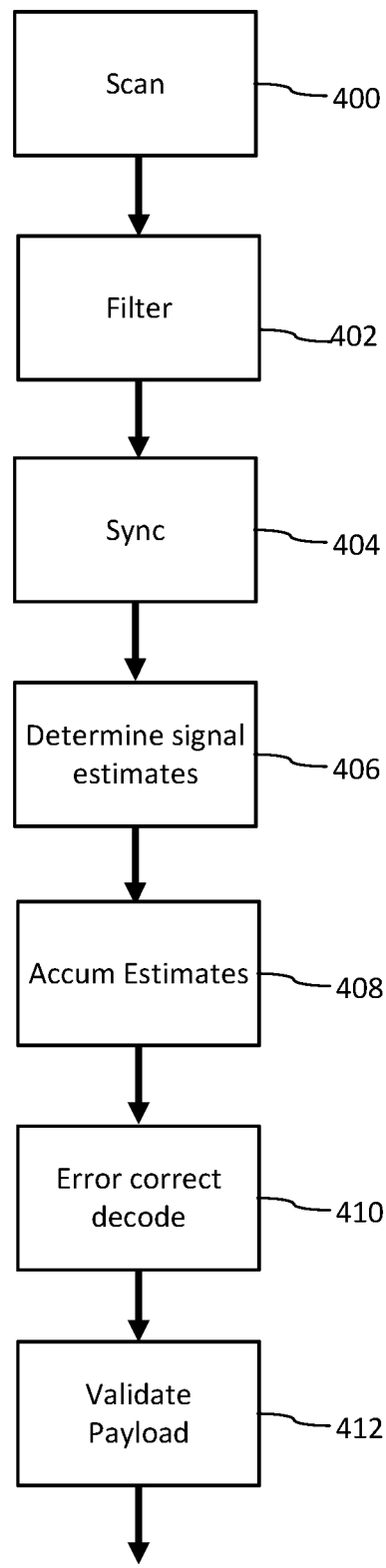
FIG. 8 is a flow diagram illustrating a method for decoding a payload signal from a host image signal.

FIG. 8 is a flow diagram illustrating a method for decoding a payload signal from a host image signal. While the payload signal may be decoded from electronic image file or stream of encoded host images or video, the encoding is designed to be sufficiently robust to enable recovery from video capture of the object or screen. For this part of our description, we describe decoding from images captured of an object. Adaptations for decoding from a capture of a screen display are described further in US Patent Application Publications US 20150227922 and US 20150227925. Audio processing is described in incorporated patent publications, such as 20140142958 and 62/194,185 (and non-provisional counterpart Ser. No. 15/213,335), incorporated above.

The frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the digital camera to a target resolution for further decoding.

The resulting video frames each include an image with the payload. In particular, at least some number of tiles of encoded signal are captured within the field of view, when the user positions the camera over the encoded image (or conversely, the user presents the marked portion of the object to the camera). The user may be guided with visual feedback. For example, in application for a mobile phone or tablet, the application displays the live video feed being captured of the object through the device's camera on its screen display, with a graphic overlay guiding the user on how to position the object in the center of the camera's field of view at an appropriate distance from the camera. This guidance ensures the target image content is near the center of the field of view of the camera, within a spatial scale range of the synchronization process that facilitates recovery of the encoded auxiliary signal(s).

In the initial processing of the decoding method, it is advantageous to select frames and blocks within frames that have image content that are most likely to contain the encoded payload. The block size is selected to be large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

The first stage of the decoding process filters the video signal to prepare it for detection and synchronization of the encoded signal (402). The decoding process sub-divides the image frames into blocks and selects blocks for further decoding operations. A first filtering stage converts the input color image signal (e.g., RGB values) to a color channel or channels where the auxiliary signal has been encoded. See, e.g., 20100150434 for more on color channel encoding and decoding.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, 20120078989, which are hereby incorporated by reference.

For more on filters, also see U.S. Pat. No. 7,076,082, which is hereby incorporated by reference. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of 20120078989 to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in Ser. No. 14/724,729.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes. Additionally, an erasure code schema noted above may be applied. For example, this may be employed for components of the payload transmitted in different frames of a display, or in different tiles within an image printed or otherwise marked on an object.

Next, the payload is validated by computing the check sum and comparing with the decoded checksum bits (412). The check sum matches the one in the encoder, of course.

For the example above, the decoder computes a CRC for a portion of the payload and compares it with the CRC portion in the payload.

At this stage, the payload is now passed to other requesting processes, e.g., application programs or software routines that use its contents in subsequent transaction processing. Additional authentication stages are executed to cross check an encoded biometric against the biometric of a person. In one approach, the payload includes a robust hash of the biometric. To check it, the biometric is captured from the person purporting rights in the object or transaction, robustly hashed using the same process used to generate the hash in the payload, and then correlated against the robust hash decoded from the payload.

In another approach, the above decoding process provides the synchronization parameters to extract a separate layer of auxiliary signal that conveys a hash of the biometric. One example of this approach is where there is a permuted hash of a biometric, mapped to and inserted into embedding locations within the host signal per FIG. 7. In this case, the synchronization process provides a means to geometrically register the received image to these embedding locations. The registered image is then checked for presence of the permuted hash of the biometric. One approach is capture the biometric from a person, generate the hash (e.g., robust feature extraction), form the signal pattern from this hash (e.g., peaks in Fourier magnitude), permute the pattern with the same or corresponding key of the encoding process, and then correlate the permuted pattern with the received image. The correlation value above a correlation threshold provides a validation that the biometric of the person has been embedded in the object (or displayed image).

For details on methods and devices for decoding auxiliary data embedded in audio signals, please see: U.S. application Ser. No. 15/192,925 (counterpart international application published as WO2015100430), and Ser. No. 15/145,784, entitled DIGITAL WATERMARK ENCODING AND DECODING WITH LOCALIZATION AND PAYLOAD REPLACEMENT, filed May 3, 2016, which are hereby incorporated by reference.

Figure 9:
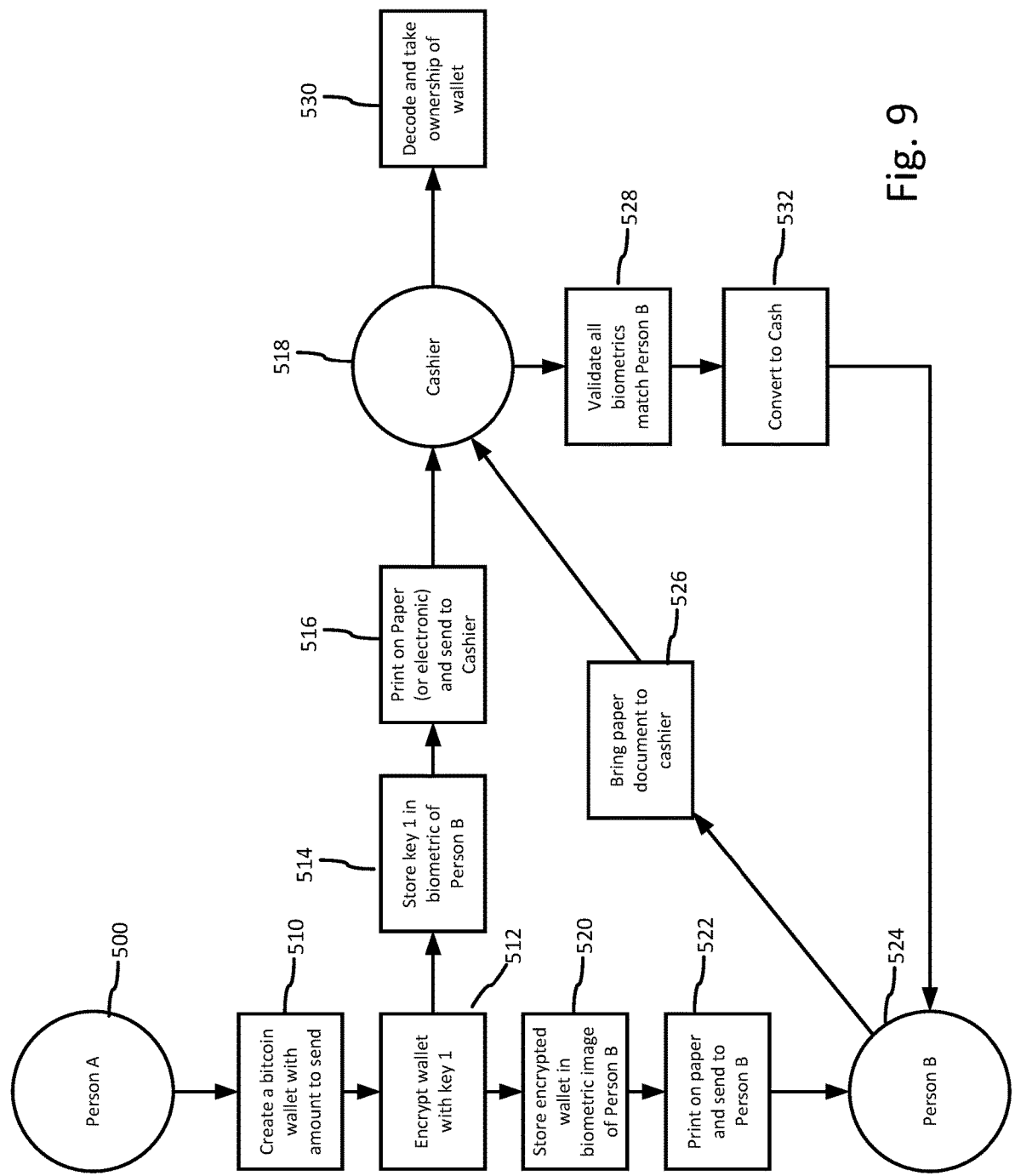
FIG. 9 a diagram illustrating processing of an encoded host signal for authenticating a transaction.

FIG. 9 is a diagram illustrating processing of an encoded host signal for authenticating a transaction. In this scenario, person A (an individual, or legal entity 500) seeks to transfer monetary value to person B (an individual, 524). For the sake of illustration, we use bitcoin as a crypto-currency for conveying monetary value. Person A would like to use a financial instrument that provides flexibility, security, and allows payment whether or not Person B has a bank account, and wherever Person may be located.

In step 510, person A creates a bitcoin wallet with the amount to send to person B. The bitcoin wallet includes the private key, address from which the funds are to be supplied, and monetary amount. These correspond to transaction parameters to be encoded in a host signal per the above description. This step is executed, for example with a bitcoin wallet application executed on a device under control of person A.

In step 512, this wallet application encrypts the wallet with key 1. This may be a key in a symmetric key, or private-public key protocol. An example of the latter is secp256k1. The purpose of encrypting the wallet with the key is to control access to unlock the wallet.

In step 514, the above described encoding process stores key 1 in the biometric of person B to authenticate that key 1 is used to unlock a wallet presented by person B. Person A captures this biometric of person B, such as a facial image, and applies the encoding process to embed key 1 in that image. This processing provides a means to securely lock key 1 to an authentication factor for person B. Additional authentication factors may be employed and required to complete the transaction, such as a password, PIN or other secret known to person B, physical ID credential held by person B (such as a physical security token like a dongle, NFC or RFID chip, ID card) as well as other biometrics of person B, like a human fingerprint. The human fingerprint may be linked with the facial image as described above. A hash (e.g., cryptographic hash such as SHA, MD5 and the like) of contents of the ID credential may also be linked with the facial image by including it in the payload embedded within it.

In step 516, the output of the encoding process 514 is printed on paper or copied to an electronic image file. The paper or file are sent to a cashier 518. The file may be transferred by electronic file transfer of various known types. Cashier is an entity providing currency exchange services that exchanges the wallet for value (e.g., cash in some other currency) that it provides to person B.

In step 520, the encrypted wallet is encoded in the biometric image of person B. This step employs one of the above described encoding processes to format the encrypted transaction parameters of the wallet into a payload or plural payload components and embed the payload into the biometric image of person B.

In step 522, the resulting biometric image with encoded payload is printed and the output provided to person B 524. Person B can receive the biometric image in a digital image file form as well, and store it in persistent storage device, e.g., electronic, magnetic or optical storage, for later retrieval for printing or display. Person B can hold that output until he wishes to convert it to cash.

When he does want to convert it to cash, person B supplies the paper with printed biometric to the cashier in step 526. Alternatively, person B displays the biometric image from step 522, on his mobile telephone, tablet device or like personal computing device. Cashier 518 scans the printed or displayed image of the biometric image from person B. Likewise, cashier 518 extracts key 1 from the biometric of person B received through step 516. Cashier also captures the biometric or biometrics, password, hash from token, etc. used as authentication factors to authenticate person B's ownership of the wallet.

In step 528, the cashier validates that all biometrics match person B. This includes a visual inspection of the image presented from steps 516 and 526, by a representative of cashier, who compares it with person B. In addition, it may also include an automated authentication of the other authentication factors, including correlation by cashier's computer of a captured biometric image from person B with the biometrics captured from the document or display. Additional authentication as described above is executed. This authentication includes validating the encoded payload by checking that the host image is properly linked to other authentication factors, such as human fingerprint of person B, password/PIN providing a key to unlock the payload, cross checking of hash of secure credential in payload, etc.

In step 530, the cashier's computer extracts key 1 and the encrypted wallet, from the respective host image signals (step 516 conveying key 1, and step 526 conveying the encrypted wallet). The respective host signals are the biometric images printed or displayed in steps 516 and 526. The cashier's wallet application applies key 1 to decrypt the encrypted wallet. It then takes ownership of the wallet. Preferably, it validates the transaction by validating it in the bitcoin protocol. This may include checking the public ledger, namely the blockchain, to confirm that person A is the valid entity capable of providing the crypto-currency value at issue.

At this time, or a later time, the cashier submits the transaction from the wallet to the bitcoin network to transfer the funds carried in that wallet to another, or other accounts/bitcoin addresses it holds, for value.

In step 532, the cashier provides cash in a currency of choice to person B. Cashier does this after satisfying itself that person B has been authenticated as the valid owner of the presented instrument, and that transaction parameters appear valid based on the check of the transaction parameters in the trust network, encoded in the blockchain.

There are several variations to the process depicted in FIG. 9. The host signal in which key 1 and the wallet is stored is a biometric of person B. The host signal may be another image, which is encoded with a biometric or its hash of that biometric of person B, as well as other authentication elements (e.g., PIN, password encrypted payload elements, tokens from a secure credential of person B, one time transaction tokens issued to person B, etc.).

The host signal may also be another form, such as an audio or video signal. As noted, the host signal may be displayed for presentation by person B on the display screen for converting the wallet to value. The display may be a motion video sequence. Person B may also present the wallet for a transaction by playing an audio signal, with the wallet encoded in it, to the cashier or other counterparty to a transaction.

This example has an intermediary, namely, the cashier, to facilitate payment to person B in cash. This transaction may be implemented as a transaction to transfer bitcoin value from person A to the cashier, which provides equivalent value in a currency to person B. Other transactions do not involve an intermediary, or involve the intermediary in a different way. For example, the wallet may be set up to transfer bitcoin output encumbered by person A to person B. The intermediary may be employed by person B to transfer his bitcoin to the intermediary in exchange for cash.

The above encoding, decoding and authentication mechanisms may be used to control rights in the use of the host signals. The host signals may be, for example, audio or video programs, or photos, encoded with transaction information that establishes which entities have rights in this content. These rights may include ownership rights and/or rights to use, modify, and/or redistribute the content. One particular usage model is one in which an entity will not be allowed to over-write a pre-existing embedded digital watermark in an image or audio signal, unless that right has been conveyed to the entity via the transaction parameters encoded in the payload within the host signal. In this case, a trust network is established based on the bitcoin protocol, with miners paid to mine transactions and add them to the blockchain. Encoding equipment cannot fulfill an embedding request unless the party seeking to perform the encoding can establish that it has obtained the right by providing a bitcoin address encumbered by its private key, for a transaction in which the embedding right has been granted. This enables others to check the blockchain and confirm that the rights encoded at the address have been transferred to the party.

A similar approach may be used to trace ownership of serialized objects or audio or image signals. The transaction history of the serialized object is recorded in a blockchain, such as blockchain protocol of the bitcoin network. The serialized object is persistently linked to the blockchain transaction record by virtue of the serial number encoded in the payload embedded in the object.

Operating Environment

The components and operations of the encoder and decoder are implemented in modules. Notwithstanding any specific discussion of the embodiments set forth herein, the term "module" refers to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of differential modulation within host image or audio content) are first implemented using a general purpose computer, using software such as MATLAB (from Mathworks, Inc.). A tool such as HDLCoder (also available from MathWorks) is next employed to convert the MATLAB model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 10:
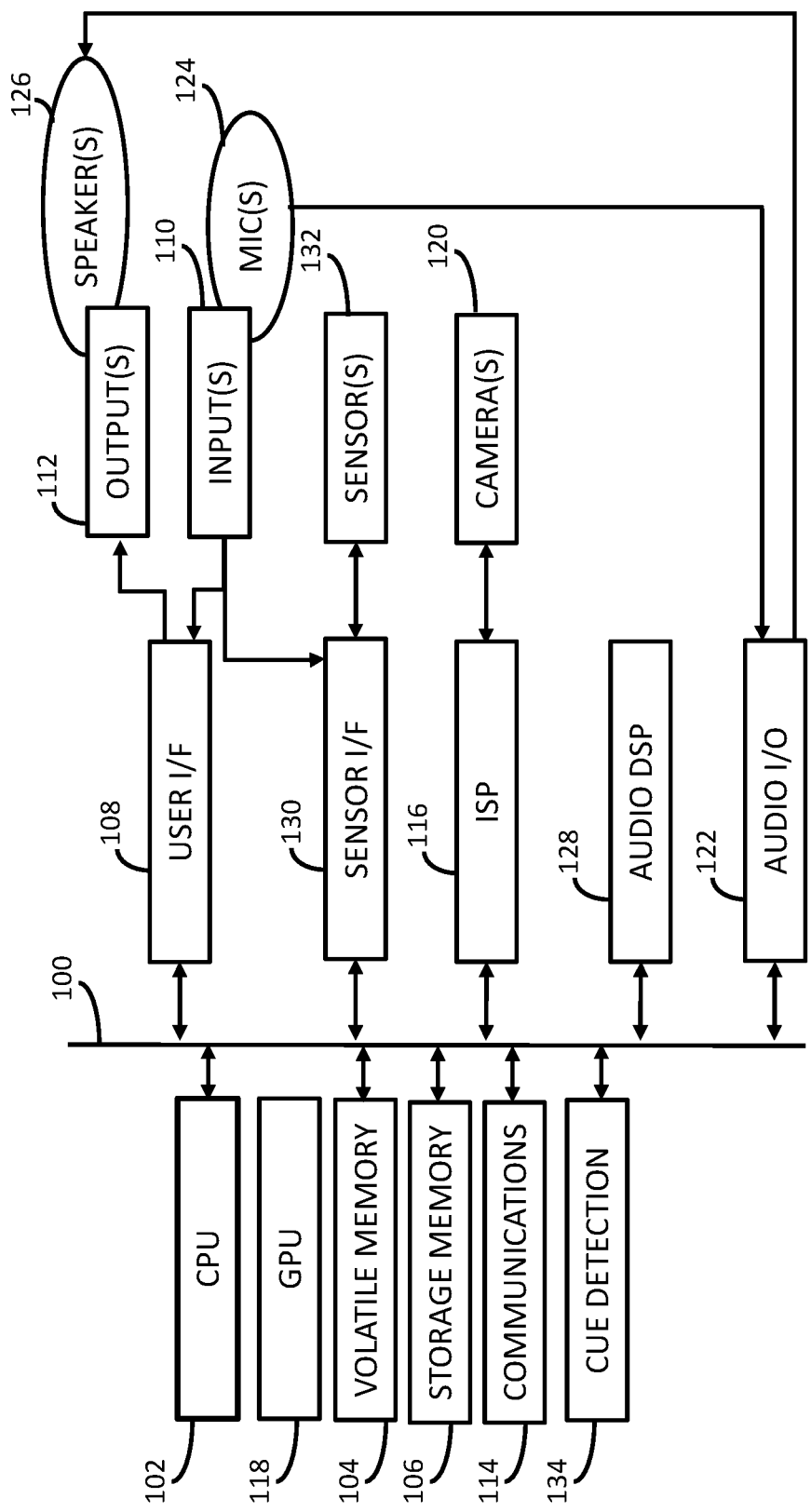
FIG. 10 illustrates an electronic device in which encoding and decoding may be implemented.

For the sake of illustration, FIG. 10 is a diagram of an electronic device in which the components of the above encoder and decoder embodiments may be implemented. It is not intended to be limiting, as the embodiments may be implemented in other device architectures or electronic circuitry.

Referring to FIG. 10, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 10 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes an application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses different devices for applying our encoded signals to objects, such as 2D and 3D printers (ink jet, offset, flexographic, laser, gravure, etc.), and equipment for etching, engraving, embossing, or laser marking.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or combinations thereof. The GPU 118 can be configured to process the image data generated by the ISP 116, thereby generating processed image data. General functions typically performed by the GPU 118 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled to the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously). The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described herein). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or combination thereof. Optionally, the communications module 114 includes cache or other local memory device (e.g., volatile memory, non-volatile memory or a combination thereof), DMA channels, one or more input buffers, one or more output buffers, or the like or combination thereof. In one embodiment, the communications module 114 includes a baseband processor (e.g., that performs signal processing and implements realtime radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 10, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Additional Embodiments

As described above, the encoding of a persistent identifier and linking to a distributed ledger, such as the blockchain, addresses a variety of challenging technical problems. Valuable electronic content objects, such as audio, image, and audio-visual works, are transformed into physical forms for consumptions by humans. The content retains its value through transformations, such as compression, transcoding and rendering, yet the digital representation changes. Thus, links to the distributed ledger that rely on content remaining within the digital domain are easily broken, without undermining the value of the content. In the following sections, we detail configurations of encoding and decoding of persistent auxiliary data in and from electronic content objects, and physical objects. We begin with electronic content objects, and then describe adaptations of the technology for physical objects.

An encoded identifier in audio-visual content persistently links each instance of content to its transaction records in the blockchain. The term, "records," is intentionally plural because the blockchain traces the transaction history of the encoded signal, and its identifier, is part of potentially many transaction entries in the blockchain. The blockchain records transactions in blocks that are linked to each other through a hash function. Parties to the transaction are entered through the addition of the transaction using the key and address transaction parameter scheme described above and in the incorporated literature. Participating nodes in the network trace and verify the history of transactions for an electronic or physical object by tracing the transactions from party to party within the blockchain. In particular, node traces the blockchain registry data structure by tracing transactions through merkle tree structures of the blocks of transactions in the blockchain. The identifier encoded in the object provides a means to identify the object within the transaction blocks of the blockchain, as well as link transactions within blocks to its metadata in a metadata database. The metadata includes a description of the work, its owners, registered rights holders and associated usage rights for the rights holders, all indexed via the identifier.

The type of transactions varies with the application. Below, we describe particular schemes for transactions involving electronic and physical objects. For applications concerned with transfers in rights in electronic content, the transactions represent transfers in rights in the electronic content or represent transfers of instances of the electronic content between parties. For physical objects, like consumer goods, packages, shipments, etc., the transactions correspond to transfers of the physical objects between parties.

The blockchain data structure stores records of transactions between parties in which transfers occur from output address to input address of the parties' addresses established in the trust network. Examples of the trust network, include a bitcoin or Ethereum based trust network. The address of the output of a first transaction for an object becomes the input address for a subsequent transaction. The private key of the transferring party unlocks the output of the first transaction, and the network records the transfer to the output address of the transaction controlled by the receiving party (via the party's private key to public key relationship to the address).

A party seeking to execute a transaction of an object uses its private key to sign a message with the input (source transaction), the object identifier, and transaction output, the address of the receiving party. In this scenario, the object identifier is persistently encoded into the object using the technology detailed in this document. Other components of the transaction, such as keys and addresses may also be encoded into the object, but this is not necessarily needed in all embodiments. Proxies for these components of the transaction, such pointers to the component and/or hashes of them, may be encoded in the object in some embodiments. This provides an additional mechanism to link the object to the transaction record, and authenticate an object against the corresponding transaction components in the record and identification of a party asserting rights or ownership of the object.

Electronic objects of creative works, like music, visual art and audio-visual works, can and often are altered without substantially impacting their value. This presents a technical challenge when seeking to leverage a blockchain because existing applications of it do not provide a reliable, persistent way to associate altered works with blockchain transactions. The robust watermark technology described in this document (and incorporated material) provides a technical solution that persistently links the electronic object to the blockchain registry. Even if an electronic instance of a creative work undergoes a transformation that alters the digital form, the embedded identifier number provides a robust link into the distributed ledger. The embedded identifier is robust to transformations that do not impair the aesthetic value, such as compression, transcoding, re-sampling, D/A-A/D conversions, etc. While content fingerprints have a role in a complete system, as we describe below, they do not provide the capability to distinguish between instances of a creative work, and as such, are inferior to the robust identifier.

Another technical challenge is how to manage and track authorized derivative works. Preferably, the registry should be able to support transactions in creative works where the recipient procures rights to create a derivative work. However, due to the robustness of the identifier, it may and often will survive in the derivative work, yet the presence of identifier in the derivative work can cause ambiguity in identifying it apart from the parent work or works from which it is derived. This is disadvantageous because it is desired in some embodiments to manage rights in and track transactions of the derivative separately from the parent work from which it is derived. Users typically wish to create mixes, mash-ups or compilations of works previously encoded with identifiers and registered in the ledger. As such, we have developed embodiments that address derivative works.

Figure 11:
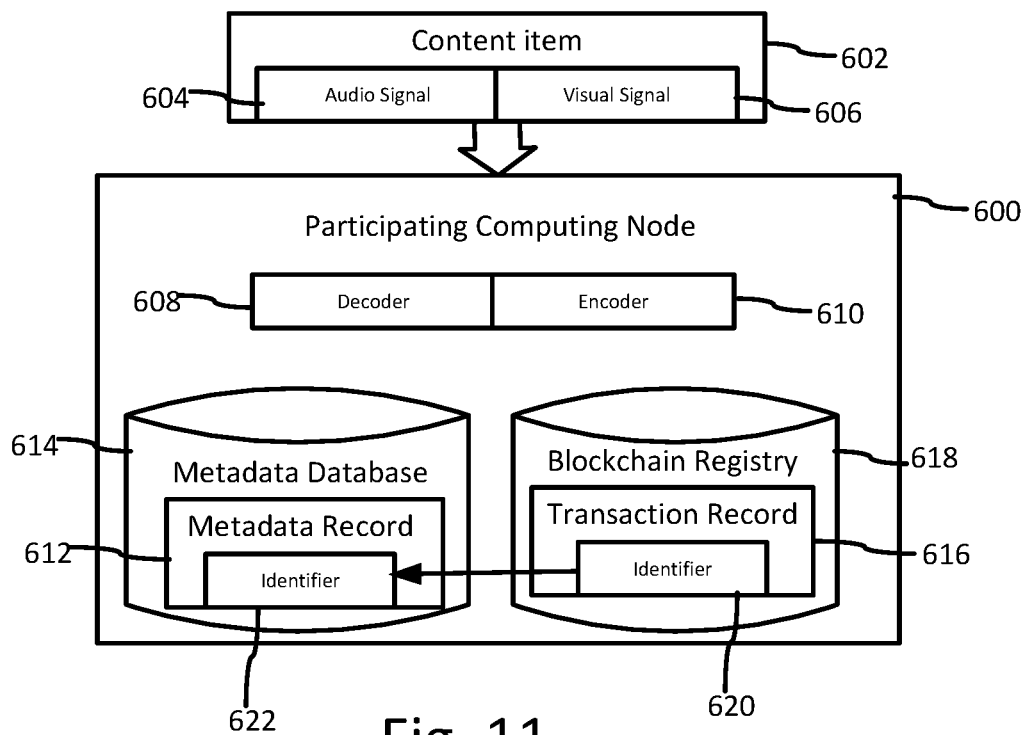
FIG. 11 is a block diagram illustrating elements of a participating computing node in an embodiment of an object transaction management and tracking system.

FIG. 11 is a block diagram illustrating elements of a participating computing node 600 in an embodiment of an object transaction management and tracking system. This system has a distributed architecture of network connected computing nodes, like node 600. In this networked system, transaction parties and other users of the system install instances of software applications on computers under their control. These applications are a form of wallet program that form and submit transaction messages for object transactions to the trust network. We refer to such devices programmed with the software applications as participating computing nodes. The computing nodes interoperate to build and maintain a blockchain of transactions and a metadata database for objects. The architecture is distributed, as in the case of a distributed ledger, as the blockchain is replicated within participating nodes, and participating nodes cooperate to validate transactions, form them into blocks, and add them to the blockchain. A blockchain is implemented using programming libraries, such as libraries for the blockchain of bitcoin or Ethereum, to name a few examples.

Here, we refer to objects as including electronic content objects, like audio-visual creative works, and physical objects. Where there are differences in system implementation, we refer specifically to content objects or physical objects. Content objects are content items comprised of audio, visual, or both audio and visual signals (generally referred to as AV signals). Examples of content items are image, video (TV programs or movies), and audio files. For illustration purposes, FIG. 11 shows a content item 602, which is comprised of an audio signal 604 and a visual signal 606. When the content item 602 is the subject of a transaction, it is submitted (e.g., in digital file form) along with the transaction parameters (e.g., key and address) to a participating node for processing of the transaction.

The computing node 600 includes software programs that process audio-visual signals from a content item 602 to perform decoding and encoding of auxiliary data, in connection with a transaction. An auxiliary data decoder 608 and encoder 610 are installed as software programs for execution on the node. For details of example embodiments of decoders and encoders, please refer to the description above describing various implementations, with reference to incorporated publications.

The decoder 608 checks the AV signal in the content item file for the presence of auxiliary data, and if detected, decodes the data including its content identifier. This identifier identifies the AV signal within the distributed system, linking it to its metadata records 612 in a metadata database 614 and transaction records 616 in a blockchain registry 618. In the blockchain registry, a copy of the identifier 620 is recorded in transaction records 616 pertaining to transaction of the content item in which the identifier is encoded. The identifier 620 in the transaction record 616 references the identifier 622 in metadata records 612 of the content item.

When a new content item is submitted into the system, a participating node 600 invokes an encoder 610 to encode an identifier in it. A new content item is submitted when the AV signal is new to the system or is a derivative work formed from an AV signal registered in the system. The handling of identifier decoding, removal and encoding is discussed further below.

Transactions for a content item include transactions in which a content item is distributed and transactions in which a participant is granted the right to create a derivative work. In the case of distribution, the encoded identifier in the content item remains in the content, and transaction records formed in blocks in the blockchain track the distribution of the content item from a source to one or more recipients. In the case of a derivative work, the content item is modified and tracked as a distinct work, albeit one that originates from a pre-existing work.

There are alternative encoding schemes for managing derivative works. In one scheme, the identifier detected in the content item is at least partially removed, and a new identifier is encoded in the derivative work, after it is created. In another scheme, the identifier is detected in the pre-existing work, and a new identifier is encoded in the derivative work that does not interfere with the pre-existing identifier. This latter approach is referred to as layered encoding, and is accomplished, for example, by mapping the elements of the new identifier in embedding locations that do not contain the previous identifier, or by using an orthogonal carrier signal to the carrier signal used to encode the previous identifier. The encoding of identifiers is layered such that they do not interfere, and at least the most recent layer is reliably decodable. For more details on schemes for partial removal and re-encoding and layering using orthogonal carriers, please see U.S. application Ser. No. 15/145,784, entitled DIGITAL WATERMARK ENCODING AND DECODING WITH LOCALIZATION AND PAYLOAD REPLACEMENT, which is incorporated above, and U.S. Pat. No. 7,020,304, which is hereby incorporated by reference.

The participating node of FIG. 11 shows an embodiment of where instances of program elements and data structures are included within one application program within a computing node. However, the program elements and data structures may be distributed over different devices.

Figure 12:
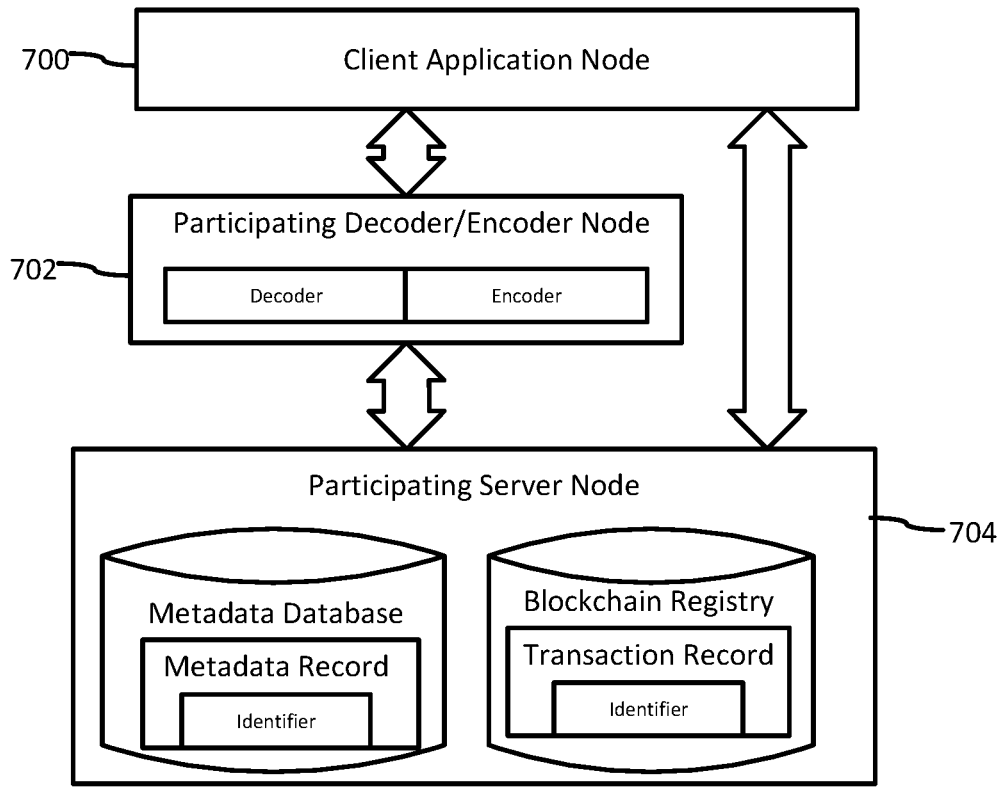
FIG. 12 is a block diagram illustrating an embodiment in which decode/encode and blockchain registry programs are distributed over different networked computers.

FIG. 12 is a block diagram illustrating an embodiment in which decode/encode and blockchain registry programs are distributed over different networked computers. In this embodiment, a client application program executes on a client application node 700. This node may be a user's personal computer or mobile device. The client application program on node 700 accesses server nodes, such as a participating decoder/encoder node 702, and a participating server node 704 with an instance of the metadata database and blockchain registry. Node 702 provides encode and decode services via a network interface (e.g., a web interface). The node 702 may download an instance of decode and encode programs to the client for operating on a content item file at the client. Alternatively, client node 700 may upload a content item file to the server 702 for encoding/decoding. Similarly, the client node may submit transactions for validation and addition to the blockchain registry to participating blockchain processing nodes 704. The system is distributed such that any node may submit requests to other nodes registered in the system to perform tasks such as decode/encode functions, transaction validation and addition to blockchain, and adding or retrieving metadata associated with an identifier to the metadata database. The metadata database may be co-located within instances of the blockchain, or may be distributed on other computing nodes.

One reason for distributing the functions is to create a thin client embodiment that leverages computing resources of network servers.

Another reason is to distribute the functions to computing nodes to different parties responsible for certain functions. For example, certain parties may provide decode/encoder services, content identifier issuance, and blockchain transaction processing. The programs may be distributed within virtual machines of cloud computing services controlled by various participants of the system.

Figure 13:
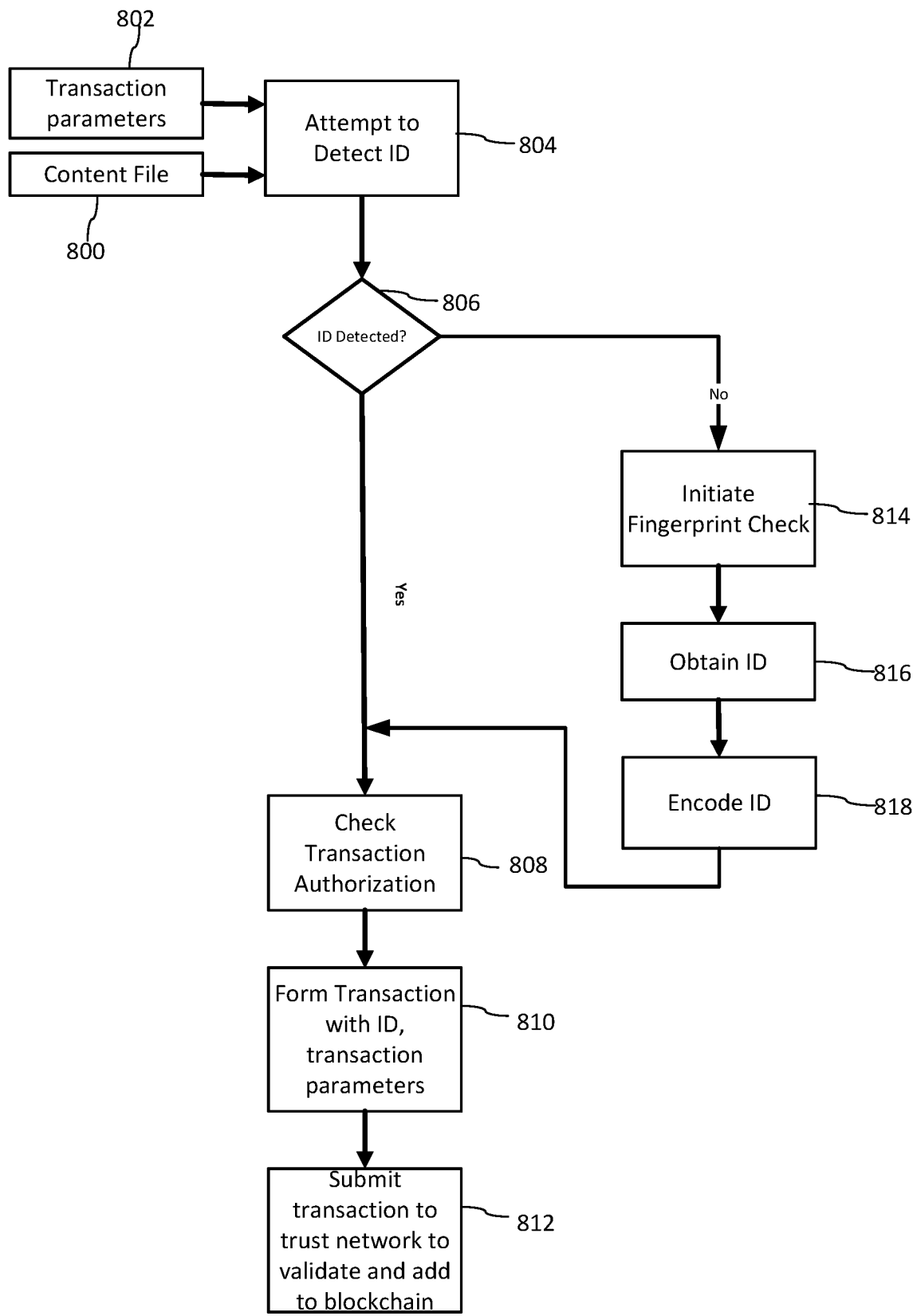
FIG. 13 is a flow diagram illustrating a method of executing a transaction of distributing a content item or physical object using an embedded ID in the item or object.

FIG. 13 is a flow diagram illustrating a method of executing a transaction of distributing a content item using an embedded ID. This method is executed in an application program executing in a participating node (e.g., FIG. 11), possibly in conjunction with other nodes (FIG. 12), as explained above. In a distribution transaction, a content item is distributed from a first party to a second party. The first party initiates the transaction by selecting the content item file 800 and providing transaction parameters 802, such as the first party's key and address of the second party. As in a wallet application, an authorized user of the first party instructs the application program to form the transaction and submit it to the distributed ledger network for validation. The program uses the private key and destination address to generate a transaction message.

Taking the content item file as input, the application program invokes a decoder to attempt to detect an identifier embedded in the audio or visual signal (804). For the sake of illustration, we will refer to an audio signal. The process is similar for a still image or video signal, though the particular decoding technology is adapted to the signal type, as described above and in the incorporated publications. The process of decoding includes transforming the audio signal to a domain in which the auxiliary data signal is detected (e.g., transform to frequency domain), performing synchronization to locate embedding locations, extracting and accumulating signal estimates, and error correction decoding of the accumulated estimates to generate a payload.

The decoder process indicates whether it has detected a valid identifier in the payload (806). If one is not present or detectable, the output of the decoder specifies that a valid payload has not been detected. If one is present, the identifier is output from the decoder.

The application then proceeds to execute processes to check the transaction authorization as shown in block 808. One process is to check that the first party has rights to distribute the content item. One way this process is implemented is by submitting the decoded identifier and party identifier to the metadata database, which returns a message indicating whether the requested usage right for the content item has been granted to the party. The metadata database system searches the database record with the identifier to determine whether a distribution right has been authorized for the first party in the usage rights linked to the object via the identifier. Another way this is implemented is by checking the blockchain for a transaction output in which the distribution right has been conveyed to the first party. These processes are not necessarily mutually exclusive, as the metadata database may be updated by a program that searches the blockchain for the identifier and updates the metadata record associated with the identifier with party identifiers of the parties with distribution rights for the content item.

Next, the application forms the distribution transaction as shown in block 810. In this process, the transaction is generated by signing a transaction message with the first party's private key and designating the address of the second party as the recipient. The first party's key is used to generate the digital signature that unlocks the output of a previous transaction of the content item to the first party. The address of the second party is encumbered with the requirement that the second party produce a digital signature with its private key associated with the second party's address. The identifier is also included in the transaction message and recorded in the blockchain.

In block 812, the application program submits the transaction components in a transaction message to participating nodes in the trust network via a network communication protocol (TCP) of the internet. The trust network validates the transaction and adds it to the blockchain registry according to its established protocol as described above and referenced publications. Additionally, the identifier is included in the blockchain record, and it also points to the corresponding metadata in the metadata database.

In the case where in identifier is not detected in the content item, the method proceeds to initiate processes to check similarity of the content item to previously registered items, and if appropriate, to obtain a new identifier for it and register it within the system. Block 814 refers to a process for checking for similar content items that have been previously registered. One way to accomplish this is to establish a content fingerprint database, using content fingerprint technology. Content fingerprint technologies have been developed for images, audio (music) and video. The fingerprint database is established by submitting a reference file to an enrollment process. The enrollment process breaks the reference file into blocks, computes a robust hash of each block (sometimes referred to as a fingerprint), and stores the robust hashes in a database, with reference to an identifier that links the hashes to the reference file and its metadata.

Then, in the subsequent flow of transaction processing, the content item fingerprint database, developed from content item reference files, is used to find matching content for a content file in which no embedded identifier is detected. The AV signal in this file is subdivided into blocks, which are then hashed and then matched against the fingerprint database. The database matching process returns the identifier of a matching reference work where match criteria are satisfied.

For additional implementation details of content fingerprint technology for this aspect of the system, one may refer to the content fingerprint technology detailed in published literature, as follows. U.S. Pat. No. 8,842,875, which is hereby incorporated by reference, describes use of content fingerprint technology to determine whether identifier has been previously assigned to similar content.

Examples of audio signal fingerprinting can be found in U.S. Pat. Nos. 7,516,074, 6,990,453 and 7,359,889, and US Publications 20050141707, 20050259819, and 20060075237, which are incorporated by reference.

Examples of video signal fingerprinting can be found in U.S. Pat. No. 7,486,827, and US Publications 20070253594 and 6454476955; which are incorporated by reference.

Examples of image fingerprinting include SIFT and SURF based methods discussed above and in US Publication 20100322469 and International Publication WO2012156774A1, which are incorporated by reference.

In the context of FIG. 13, the content fingerprint database is useful to identify content files for which an embedded identifier cannot be detected. The content fingerprint database is established by having content providers submit reference files and metadata describing the content item in each of the files (identifier, title, owner, usage rights, etc.). It is further updated by adding reference files, as parties submit content files for transactions. Preferably, the metadata record data structures associated with the identifiers of reference files in the fingerprint database are linked to the metadata record database for content items with embedded identifiers by associating the embedded identifiers with the identifiers of the reference files (e.g., e.g., the records cross reference each other through relational structure, pointer, or the like).

One particular form of transaction, as noted above, is enrollment of a new content item in the blockchain registry and metadata database system. One useful part of the enrollment is the fingerprint check process to detect a conflict between a submitted content file 800 that does not have an embedded ID, and a similar one that has been encoded with an identifier and previously enrolled in the fingerprint database. The fingerprint check of the new content item reveals whether the new content file has matching portions with a previously registered item. The metadata of the matching reference file and the extent of the overlap can be provided to the client application program in the participating node via a web interface. This enables a party to determine a potential conflict with other owners in rights in the content and resolve that conflict prior to obtaining and encoding an identifier and engaging in transactions for the content item.

In block 816, the application executing in the participating node obtains an identifier. This identifier may be obtained from an issuing authority, such as a provider of the encoding technology. The identifier may also be derived from a hash of the content file. One approach to generate the identifier from a hash of the content file is to compute a robust hash for blocks of content, as described above, and then apply a one-way hash function to the robust hash for the blocks (e.g., using one of the SHA-256 or the like) to form a digital data sequence to be included in the digital watermark payload. This identifier, comprising the digital data sequence, is registered in the metadata database in a record for the content item. The robust hashes of blocks may also be stored in connection with the metadata database records for an additional authentication of the content item downstream.

In this case, additional processing is used to facilitate synchronization of the decoder. First, an auxiliary signal layer is encoded in the AV signal of the content file that provides synchronization. For details on synchronization, please refer to the discussion above and the referenced publications. Then the hash is computed from the AV signal with encoded first layer and identifier derived from it. Finally, the identifier is encoded in the AV signal as an additional auxiliary signal layer. The first encoded layer enables a downstream decoder to detect and synchronize the locations of the blocks. The robust hashes are then re-computed from the blocks and matched with the stored robust hashes in the metadata database to validate the identity of the content file.

In block 818, the application executing in the participating node encodes the identifier obtained in block 816 in the AV content signal within the content file 800. The application invokes an encoder program to perform this operation. Example implementations of the encoder are provided above, with reference to incorporated publications. As noted, this identifier is mapped to embedding locations, and these embedding locations may be selected to avoid conflict with other layers of auxiliary data (e.g., previous or subsequently encoded in the content file), or with blocks of the content used to derive hashes used to validate the content item.

After the new identifier is encoded within the AV signal of the content file, processing returns to block 808. At 808, the application program in the participating node executes a process as described above to check the transaction authorization. In the case of a new content item registration, this process confirms with the metadata database that the identifier has been registered and associated with the party seeking to transact the content item. Processing then proceeds as described for blocks 810, 812.

In the case where the requested transaction is the creation of a derivative work, processing at the participating node proceeds initially in the same way as shown in FIG. 13. The content file should already have an embedded identifier. In this case, the embedded identifier is detected, extracted and the transaction requesting the derivative work right proceeds through stages 808, 810, 812. The output of the transaction conveys the derivative work right to the party, if it is authorized based on the check of the metadata record and blockchain.

After the derivative work is created, the party with the derivative work right submits the derivative work to the system for registration. In one implementation, a pre-processing is performed before derivative work creation and submission to at least partially remove the previously encoded ID. In an alternative implementation, a new identifier is encoded in the derivative work in a new auxiliary data layer.

Figure 14:
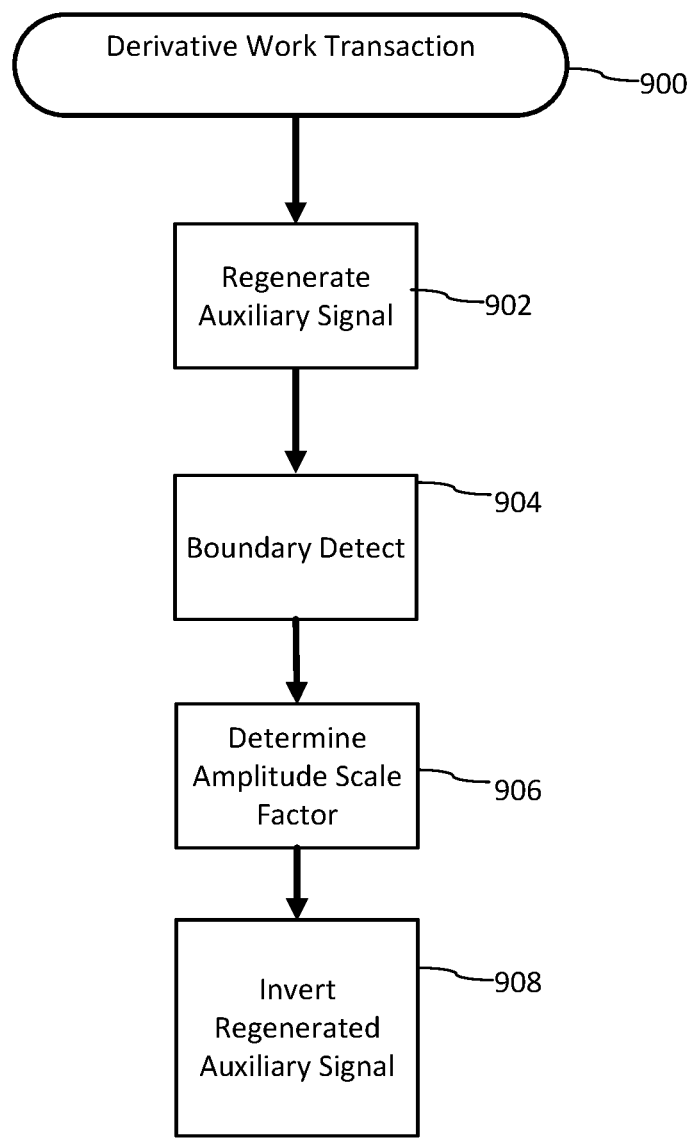
FIG. 14 is a flow diagram illustrating a method of pre-processing an audio-visual signal to at least partially remove an embedded identifier.

FIG. 14 is a flow diagram illustrating a method of pre-processing an audio-visual signal to at least partially remove an embedded identifier. This approach is detailed in U.S. application Ser. No. 15/145,784, entitled DIGITAL WATERMARK ENCODING AND DECODING WITH LOCALIZATION AND PAYLOAD REPLACEMENT, filed May 3, 2016. At 900, the processing begins at a participating node when the derivative work transaction has been authorized. This authorization is obtained via a transaction processed through ID detection (804, 806) and at least the processing of block 808 in FIG. 13, at which the participating node submits the decoded identifier to the metadata database to validate that the party has the right to create a derivative work. Preferably, additional authorization is obtained by validating that the party seeking to create the derivative work and add it to the registry has obtained the right in a previous transaction in the blockchain registry. In this case, processing proceeds through blocks 810 and 812 to confirm that the party seeking to create the derivative work has required the right reflected in the blockchain.

Once the granting of the derivative work right is validated, processing begins at block 902, in which the auxiliary signal used to embed the detected identifier in the AV signal of the content item is regenerated. This regeneration process is executed according to a process such as shown in FIG. 5. Generally, this entails a form of error correction coding of a payload, including the identifier, and mapping the coded payload to embedding locations. Additionally, this may entail a form of repetition coding and modulation with a carrier.

Next, a program in the participating node uses the regenerated signal to detect the boundary of the embedded signal in the AV signal (904). One approach to accomplish this is to apply a sliding correlation of the regenerated signal with the AV signal. This is typically carried out in the embedding domain, the domain of the AV signal at which the identifier has been embedded). The program advances the signal in this sliding correlation in steps and computes a correlation metric. The locations of correlation peaks mark the location and boundary of each instance of the embedded identifier, which is repeated in blocks of the AV signal.

Next, the program computes the scale factor of the embedded signal (906). This scale factor is an amplitude adjustment to the regenerated signal. The scale factor may be determined by applying the masking model used to embed the identifier to the AV signal, and predicting the scale factor applied to embed the identifier.

Finally, the program inverts the regenerated auxiliary signal in the AV signal (906). This can be performed by subtracting the scaled, regenerated signal from the AV signal.

After this process is complete, the party seeking to create the derivative work can proceed to create the derivative work based on the AV signal in the content item. The next transaction is then expected to be registration of the derivative work. The processing of this new registration transaction proceeds as described above for blocks 816 and 818, and preferably begins with a request to register the derivative work starting at block 804. In this request, the requesting party's application program in its participation node provides the previously embedded ID so that the system can check the validity of the derivative work right by checking that it has been granted to the requesting party in the metadata database and blockchain registry.

Where the previous ID is at least partially removed, the decoder is not expected to detect it in the processing of blocks 804, 806, and processing proceeds through 816, 818, with a fingerprint check in block 814 if desired.

At block 808 in this implementation of derivative work processing, the application program of the participating node checks that the party has previously obtained a derivative work right for a content item with the previous embedded identifier. This involves checking the blockchain registry for a prior transaction granting the right for the previous content identifier. Next, the participating node forms a transaction with the new ID, its private key and the address of a destination address (810). It then submits this transaction to the trust network (other participating nodes), which in turn, validate the transaction and add it to the blockchain registry.

In an alternative implementation, the previously encoded identifier is not removed from the content item from which a derivative work is created, yet a new identifier is encoded in the AV signal of the derivative work. This approach uses a layered encoding in which the new identifier is encoded at embedding locations and/or with a orthogonal carrier signal do minimize conflict between the previous and new identifier. This process proceeds as described above, but without processing to remove the pre-existing identifier. Layered encoding schemes may be used for this implementation. For more on layered encoding schemes, please see above and referenced publications, and in particular, U.S. application Ser. No. 15/145,784, and U.S. Pat. No. 7,020,304.

The above encoding and decoding schemes provide the technical advantage of enabling content and physical objects to be persistently encoded within a blockchain registry with an embedded identifier. This embedded identifier also reliably connects the identifier to the host object.

The above embodiments provide a technical solution to the management of derivative works as well. The embodiments provide options for re-encoding or over-encoding a new identifier into the content item of the transaction. If a party is merely getting rights to re-distribute the content (without creating a new, derivative work (e.g., mashup)), the participating machine node in the distributed blockchain network leave the pre-existing unique payload in the re-distributed content.

If a party is getting rights to create a derivative work, a new serial number is generated and encoded in the derivative work. A new work is registered in the blockchain through this new serial number. A new identifier may be encoded in a separate embedded auxiliary signal layer with or without removal of the pre-existing identifier.

The encoder programs may be distributed in each copy of the client application at nodes in the distributed trust network. Alternatively, or additionally, the encoder may be provided by a cloud service, for those wishing to have a light weight client application within their computing node.

The transfer of rights to distribute or modify content is implemented in an automated system managed through the usage rights in a metadata database and transaction validation and addition to a blockchain registry. Participating machine nodes in the network seeking content rights must have a client application that submits transactions for validation by the trust network and automates decoding and encoding functions that depend on the transaction requested and the authorization of the transaction by the network.

A participating machine node submits re-distribution transactions for validation and recording in the blockchain when it redistributes the content from network nodes under its control (e.g., streams to consumer via its content delivery network). This machine node assembles a transaction by digitally signing it and providing a destination address according to the blockchain protocol.

Parties can optionally be linked to each redistribution by encoding a party identifier in the AV signal of the content item or image printed or marked on a physical object. In one embodiment, the party identifier is a digital bit sequence concatenated with other payload fields (e.g., a field containing a serial number serving as a content identifier). In another embodiment, the party identifier is a digital bit sequence encoded in a separate layer from the content identifier. Each payload may further be concatenated with a counter output or time or position code, and encoded in a sequence of spatial or temporal blocks in the AV signal (e.g., video or audio frames, pixel blocks, contiguous blocks of audio samples, or the like). The identifier is repeated through the AV signal, but includes a variable part that is useful in identifying the part of the content signal that has been transacted or detected. If suspected unauthorized content is found, it may be traced back to its distribution history in the blockchain registry, and back to the distributor of that content. Additionally, the positional codes detected at any node indicate the particular portion of a signal that has been detected.

Tracing of a suspect item is performed by submitting the AV signal of the suspect item to a decoder, which extracts the embedded identifier(s). The decoder may also decode an additional layer identifying the last distributor of that AV signal.

Several enhancements may be included within the system. After encoding of an identifier in a AV signal, a one-way cryptographic hash of the encoded signal may be added to the registry for the transaction, using above described approaches. Examples of one-way cryptographic hash functions, include SHA-256, MD5 or the like. The cryptographic hash, if fragile, will not be maintained if the AV signal is transformed. Thus, a robust hash, such as a series of content fingerprints using above referenced content fingerprint methods, may be derived from the encoded signal and linked to it in the metadata database by associating the hash messages with the embedded identifier. Additionally, a robust hash may be used to detect similar content to the content registered in the blockchain. The robust watermark payload extracted from a signal is used to trace it to particular node(s) in the distribution history recorded in the blockchain registry.

For physical objects, e.g., serialized objects printed with a digital press, much of the above schema applies. For methods for serializing objects with embedded identifiers, please see U.S. application Ser. No. 15/167,932 (Now U.S. Pat. No. 9,928,561), filed May 16, 2016, entitled SERIALIZED DIGITAL WATERMARKING FOR VARIABLE DATA PRINTING, which is hereby incorporated by reference. One difference is that once the physical object is created by printing or marking the object with an image bearing the embedded identifier, the authentic object is not expected to be altered. In this case, the participating nodes in a trust network collaborate to create a blockchain transaction history that traces the distribution of the product through the supply chain. Parties to the transactions have private key-address pairs per the blockchain scheme already described. When a supply chain member ships objects, its participating node in the network submits a transaction to the trust network, which in turn, validates and enters the transaction in the blockchain registry. The blockchain entry process may be built on consensus methods such as proof of work, proof of stake, or the like, as currently implemented in a bitcoin blockchain or Ethereum blockchain based trust networks.

For physical objects, a digital camera scans an image (or sequence of image frames) of the object and passes the digital image(s) to a decoder to extract the embedded payload, including identifier. The identifier is read and submitted for each distribution transaction for the object. The embedded digital payload that conveys the identifier is also authenticated by checking its relationship with physical features that are optically read from the object (including its label or packaging), as described in this document and the referenced publications. If the relationship is broken, then the object is deemed not to be authentic, and is flagged as such in the transaction record, and/or removed from the supply chain.

Some examples of physical features that are optically read from a physical object are described in U.S. Pat. Nos. 4,423,415 and 5,673,338, and 8,126,203 which are hereby incorporated by reference.

One approach is to encode a measure of the physical features in a portion of the digital payload embedded in the image applied to the physical object. Some examples of this approach are disclosed in U.S. Pat. Nos. 8,190,901, 7,519,819, which are referenced and discussed above.

Another approach is to permute at least a portion of the payload with a hash of the physical features of the physical object. This permutation operates to preclude decoding of the payload without having a valid hash of the physical features. One embodiment scrambles at least part of watermark payload based on product specific attribute as a seed. This approach and additional ways to form a relationship between an embedded signal and host signal for authentication are described in U.S. Pat. Nos. 6,823,075, 6,978,036 and 7,055,034, which are hereby incorporated by reference.

In another approach, spatial locations of particular physical features are extracted and embedded into an auxiliary signal. One such example is the example in US Publication 20050063562 discussed and incorporated above. In this approach, the spatial locations are permuted and then embedded into the image signal printed or applied to the physical object as described in 20050063562.

In another approach, the embedded auxiliary signal is comprised of robust and fragile signals. When the object is copied via a digital scan and print cycle, the ratio of the robust to fragile signal changes. An object is authenticated by measuring this ratio from a digital scan of the suspect object. Please see U.S. Pat. No. 6,636,615, which is incorporated by reference. Additional image based metrics and methods for distinguishing an original from a copy are described in U.S. Pat. Nos. 7,607,016, 6,694,041, 6,512,837, 7,054,461, 7,246, 239 and 6,771,797, which are hereby incorporated by reference.

Color or spectral measurements at pixel locations of a scanned image of a physical object (e.g., printed label, package or the like) are also used as physical features that form a relationship with the payload and/or carry embedded payload signal elements. For example, out of gamut inks and metameric relationships are used to encode embedded data in images printed on original objects, and these relationships, if not detected, signal that a suspect object is a fake. Please see these and additional authentication structures, methods for creating them and authenticating them, in U.S. Pat. Nos. 8,144,368, 8,094,869, and 7,856,116, which are hereby incorporated by reference.

Programmatic analysis of the block chain provides various ways to generate a distribution history of a valid object. This history can then be compared with an object identifier and location or party identifier where a suspect object is found to determine whether the suspect object is valid. In particular, this can be used to identify the diversion of authentic goods to unauthorized distribution locations. It can also be used to detect anomalies, such as duplicate objects that are identified on more than one distribution path in the tree of the distribution history. The merkle tree structures in the transaction blocks of the blockchain registry (e.g., like merkle trees used in bitcoin blockchain) provide an efficient data structure for searching transaction history of an object. As explained above, the system includes the embedded identifier in the transaction history, or a proxy of it (e.g., a hash) which enables searching of the tree and indexing based on the identifier.

In some embodiments, the embedded identifier on a physical object provides sufficient functionality in terms of traceability and authentication, that it need not be supplemented. In other embodiments, there are enhancements that enable additional encoding of embedded identifiers at downstream locations within a distribution chain.

One such option is overprinting an additional embedded signal onto the object at a stage in the distribution. This additional embedded signal may be used to provide an identifier of a party, or to include additional payload bits that are included in the transaction record for the object. Overprinting may be achieved by inkjet printing, for example. Another option is to apply the additional embedded signal on a label or sticker applied to the object at a stage in its distribution. These alterations to the object provide a mechanism to physically link the object to particular entities, locations or handling states in the supply chain.

While some object tracking may be accomplished using conventional barcodes or RFID tags, the embedding of hidden payloads within images applied to objects provides several advantages. One advantage is that the hidden aspect of the code means that its existence is not known, which mitigates attempts to alter or copy it to other objects. Another advantage is that it is woven into other information bearing image signals printed or otherwise imaged onto the packaging (like Direct Part Marking, DPM). It does not occupy additional space of other machine readable codes, and does not add material costs and complications of application of RFID tags. The hidden data carrying capability makes it well suited to create relationships between the embedded signal and physical attributes on the object. These physical attributes may be unique to the object, which prevents that embedded data from copied to another object while maintaining its relationship to the unique physical attributes of the original object. The digital payload may include attributes or be scrambled or permuted using a hash of those attributes as a seed to the scrambling function. In particular, the payload may be linked in this way to a physically un-clonable function of the physical object. See, U.S. Pat. No. 8,126,203, referenced above. The embedded signal may also include a fragile aspect that is not reproduced in copies of the object, as described above.

In addition, a layered structure of the embedded signal enables the layers to deliver different functions. A first watermark layer is encoded to provide a persistent link to metadata records and transaction records in the blockchain. A second watermark layer conveys transaction parameters as detailed in embodiments above. One approach is to embed an encrypted form of a private key and output address of a transaction in which a party obtained the object. This allows a decoding application, authorized to access it via key, to decode the private key and address, to form the transaction and submit it to the trust network for execution (validation and entry in the blockchain). Another approach is to encode the transaction message, with the digitally signed message, into the object. The transaction is submitted to the trust network for execution of the transaction via embedding it in the object itself. Nodes that receive the object decode the transaction message, if authorized, (e.g., with decoding and decryption key), validated it and enter it into the blockchain.

With this second watermark, the content item or object with the embedded transaction components becomes a physical carrier of a transaction, which is processed by other participating nodes to execute or complete the transaction. In this approach, distribution of the object or content signal also distributes the transaction to participating nodes. Parties to whom access is provided to the second watermark decoding key or keys are able to enter valid transactions in the object or content in the blockchain, while others who do not have such access cannot. This opens many options for distributed processing of transactions through distribution of objects.

For implementation, the Ethereum network is suited for these transactions because it provides a programming framework in which self-executing contracts for rights in the object may be written. This programming framework enables developers to encode conditions within a transaction that are executed automatically, when a node or nodes detect that the conditions are met.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a non-transitory memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions. Other examples of signal projections or transforms include Wavelet transforms and subband transforms. Still other examples include DCT, PCA, SVD, and KLT.

The particular combinations of elements and features in the above-detailed embodiments are exemplary only; the interchanging and substitution of these teachings with other teachings in this and the incorporated-by-reference patents/applications are also contemplated.

What is claimed is:

1. A device comprising:
   memory configured to store an image signal and transaction parameters associated with a transaction, the transaction parameters comprising a key and an address of the transaction;
   a processor, in communication with the memory, the processor configured with instructions to:
   extract features from the image signal;
   form a digital payload comprising the features, the key and the address;
   modulate a carrier signal with the digital payload to produce a modulated carrier signal;
   map elements of the modulated carrier signal to locations within the image signal; and
   modify the image signal at the locations according to corresponding elements of the modulated carrier signal to form an encoded image signal in which the features, key and address are encoded.

2. The device of claim 1 wherein the image signal comprises a biometric of a user.

3. The device of claim 2 wherein the biometric comprises a facial image of the user.

4. The device of claim 1 further including a printer, the processor configured with instructions to print the encoded image signal with the printer.

5. The device of claim 1 further including a display, the processor configured with instructions to display the encoded image signal on the display.

6. A device comprising:
   an image sensor;
   a memory configured to store an image captured from the image sensor;
   a processor, in communication with the memory, the processor configured with instructions to:
   determine a geometric transformation of the image;
   extract features from the image using the geometric transformation to locate the features;
   decode an auxiliary data signal encoded within the image using the geometric transformation to locate bit cells in which elements of the auxiliary data signal are encoded; the auxiliary data signal comprising transaction parameters and an encoded hash of the features, the transaction parameters comprising a transaction key and address associated with a user;

compute a first hash of the features;

compare the first hash of the features with the encoded hash;

form a transaction with the transaction key and address; and submit the transaction to a distributed network to complete the transaction.

7. The device of claim 6 wherein the image comprises a biometric of a user, printed on an object or displayed on a display screen.

8. The device of claim 7 wherein the biometric comprises a facial image of the user.

9. A system comprising:

a plurality of computing nodes;

a first computing node comprising memory and a processor, the processor configured with instructions to:

obtain a request of a first party to process a transaction of a first content item, the first content item comprising a first audio signal stored in the memory, the transaction comprising distribution of the first content item;

decode an auxiliary data signal encoded within the first audio signal stored in the memory to extract a digital payload;

obtain an identifier from the digital payload;

access metadata linked to the first content item by the identifier to determine whether the transaction is authorized; and digitally sign the transaction into a signed message and provide the signed message and address for the transaction to a distributed blockchain registry in the plurality of computing nodes to register the transaction for the first content item in the distributed blockchain registry.

10. The system of claim 9 further comprising:

means for detecting absence of an identifier in a second audio signal of a second content item;

means for encoding a second identifier in the second audio signal;

means for registering the second identifier in a metadata database; and means for digitally signing a second transaction into a signed message and means for providing the signed message, second identifier and address for the second transaction to the distributed blockchain registry in the plurality of computing nodes to register the second transaction for the second content item in the distributed blockchain registry.

11. The system of claim 9 wherein the transaction comprises creation of a derivative work of the first content item; and wherein said system further comprises:

means for encoding a second identifier in the first audio signal;

means for registering the second identifier in a metadata database; and means for digitally signing a second transaction into a signed message and means for providing the signed message, second identifier and address for a second transaction to the distributed blockchain registry in the plurality of computing nodes to register the second transaction for the first content item in the distributed blockchain registry.

* * * * *